US012802018B2

(12) United States Patent
Bean et al.

(10) Patent No.: US 12,802,018 B2
(45) **Date of Patent: *Nov. 17, 2026**

(54) AUTOMATIC BARCODE BASED PERSONAL SAFETY COMPLIANCE SYSTEM

(71) Applicant: Active Witness Corp., White Rock (CA)

(72) Inventors: Charles Alfred Bean, Calgary (CA); David Allan Black, North Vancouver (CA); Rajeev Kumar Bakshi, White Rock (CA)

(73) Assignee: Active Witness Corp., White Rock, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 18/954,070

(22) Filed: Nov. 20, 2024

(65) Prior Publication Data

US 2025/0078010 A1 Mar. 6, 2025

Related U.S. Application Data

(63) Continuation of application No. 18/008,441, filed as application No. PCT/CA2021/050766 on Jun. 4, 2021, now Pat. No. 12,159,255.

(Continued)

(51) Int. Cl.
*G06Q 10/06* (2023.01)
*G06F 16/903* (2019.01)

(Continued)

(52) U.S. Cl.
CPC . *G06Q 10/06398* (2013.01); *G06F 16/90335* (2019.01); *G06K 7/1413* (2013.01); *G06K 7/1443* (2013.01)

(58) Field of Classification Search
None
See application file for complete search history.

(56) References Cited

U.S. PATENT DOCUMENTS 7,324,693 B2 1/2008 Chen
8,282,274 B2 10/2012 Pang et al.

(Continued)

FOREIGN PATENT DOCUMENTS

WO 2018152475 A1 8/2018
WO 2019064108 A1 4/2019

OTHER PUBLICATIONS

Barro-Torres et al. (Santiago Barro-Torres, Tiago M. Fernández-Caramés, Héctor J. Pérez-Iglesias, Carlos J. Escudero, Real-time personal protective equipment monitoring system, Computer Communications, vol. 36, Issue 1, 2012, pp. 42-50, ISSN 0140-3664, https://doi.org/10.1016/j.comcom.2012.01.005).*

(Continued)

*Primary Examiner* — Matthew D Henry
(74) *Attorney, Agent, or Firm* — SMART & BIGGAR LP; Tonino Rosario Orsi

(57) ABSTRACT

Various implementations for an automatic system and processes for monitoring the use of personal protective equipment in a work space are provided. The system includes barcodes attached to the personal protective equipment. The operation of the system involves capturing images of the work space and detecting human form objects and barcode objects in the images. The system and processes further involve calculating the probability that a user is wearing all personal protective equipment in accordance with safety rules applicable to the work space. In some implementations, the system and processes may be used to track personal protective equipment and other objects in a work space. Accordingly, the system and processes may be used (Continued)

to prevent or limit the occurrence of accidents, incidents and/or injuries in hazardous work environments.

20 Claims, 13 Drawing Sheets

Related U.S. Application Data

(60) Provisional application No. 63/035,298, filed on Jun. 5, 2020.

(51) Int. Cl.
*G06K 7/14* (2006.01)
*G06Q 10/0639* (2023.01)

(56) References Cited

U.S. PATENT DOCUMENTS

| | | | | |
|---|---|---|---|---|
| 8,938,124 | B2 | 1/2015 | Eilat et al. | |
| 9,256,781 | B2 | 2/2016 | Perski et al. | |
| 2014/0307076 | A1* | 10/2014 | Deutsch | G06V 10/56 348/77 |
| 2017/0169533 | A1 | 6/2017 | O'Brien | |
| 2020/0410444 | A1* | 12/2020 | Bohannon | G06Q 10/0875 |
| 2022/0101290 | A1* | 3/2022 | Handshaw | G16H 40/63 |
| 2023/0214758 | A1* | 7/2023 | Bean | G06Q 10/06398 705/7.42 |
| 2023/0343040 | A1* | 10/2023 | Donoghue | A62B 27/00 |

OTHER PUBLICATIONS

Musu et al. (C. Musu, V. Popescu and D. Giusto, "Workplace safety monitoring using RFID sensors," 2014 22nd Telecommunications Forum Telfor (TELFOR), Belgrade, Serbia, 2014, pp. 656-659, doi: 10.1109/TELFOR.2014.7034494.).*

"Ten Ways to Prevent Eye Injuries at Work", Prevent Blindness, 2017 <http://www.preventblindness.org/ten-ways-prevent-eye-injuries-work> (4 pages).

Groce, "Drive home the value of gloves: Hand injuries send a million workers to ERs each year", Industrial Safety & Hygiene News, 2012 <http://www.ishn.com/articles/94029-drive-home-the-value-of-gloves—hand-injuries-send-a-million-workers-to-ers-each-year> (3 pages).

International Search Report and Written Opinion mailed Jul. 22, 2021 in International Patent Application No. PCT/CA2021/050766 (9 pages).

Dalal and Triggs "Histograms of oriented gradients for human detection" (2005) International Conference on Computer Vision & Pattern Recognition pp. 886-893 (9 pages).

Lowe "Object Recognition from Local Scale-Invariant Features" (1999) In: Computer vision, The proceedings of the seventh IEEE international conference on, vol. 2, pp. 1150-1157 (8 pages).

Papageorgiou et al., "A General Framework for Object Detection" (1998) In Computer vision, sixth international conference on, pp. 555-562 (8 pages).

Dalal et al., "Human Detection Using Oriented Histograms of Flow and Appearance" (2006) Computer Vision—ECCV 2006. Lecture Notes in Computer Science, vol. 3952 (14 pages).

Viola and Jones "Robust Real-time Object Detection" (2001) Second International Workshop on Statistical and Computational Theories of Vision—Modeling, Learning, Computing and Sampling (25 pages).

Blaschko and Lampert "Learning to Localize Objects with Structured Output Regression" (2008), In: Computer Vision—ECCV, 2-15, Springer (14 pages).

Gavrila "The Visual Analysis of Human Movement: A Survey" (1999) Computer Vision and Image Understanding, vol. 73, No. 1, 82-98 (17 pages).

Wang et al., "Recent developments in human motion analysis" (2003) Pattern Recognition, 36 285-601 (17 pages).

Redmon et al., "You Only Look Once: Unified, Real-Time Object Detection" (2016) IEEE Conference on Computer Vision and Pattern recognition, pp. 779-788 (10 pages).

Girshick et al., "Rich feature hierarchies for accurate object detection and semantic segmentation" (2014) IEEE Conference on Computer Vision and Pattern recognition (8 pages).

Ren et al., "Faster R-CNN: Towards Real-Time Object Detection with Region Proposal Networks" (2016), IEEE Transactions on Pattern Analysis and Machine Intelligence 39 (6), arXiv:1506.01497 (14 pages).

He et al., "Mask R-CNN" (2017) IEEE Conference on Computer Vision and Pattern recognition, arXiv:1703.06870 (12 pages).

Nguyen "Human Detection from Images and Videos" Thesis submitted for Doctor of Philosophy of Computer Science at University of Wollongong (Oct. 2012) (184 pages).

Lienhart and Maydt "An Extended Set of Haar-like Features for Rapid Object Detection" (2002) International Conference on Image Processing (4 pages).

Russakovsky et al., "ImageNet Large Scale Visual Recognition Challenge" (2015) Int J Comput Vis 115:211-252 (43 pages).

Stauffer and Grimson "Learning patterns of activity using real-time tracking" (2000) IEEE Transactions on Pattern Analysis and Machine Intelligence, vol. 22, No. 8, pp. 747-757 (17 pages).

Brownlee "A Gentle Introduction to Object Recognition with Deep Learning" (May 2019) Machine Learning Mastry <https://machinelearningmastery.com/object-recognition-with-deep-learning/> (3 pages).

Eichner and Ferrari "We Are Family: Joint Pose Estimation of Multiple Persons" ECCV 2010: Computer Vision—ECCV 2010 pp. 228-242 (15 pages).

Extended European Search Report dated Jun. 7, 2024 in European Patent Application No. 21817493.6 (13 pages).

Barro-Torres et al., Real-time personal protective equipment monitoring system, Computer Communications, vol. 36, Issue 1, 2012, pp. 42-50 (9 pages).

* cited by examiner

AUTOMATIC BARCODE BASED PERSONAL SAFETY COMPLIANCE SYSTEM

CROSS-REFERENCE TO RELATED APPLICATION

This application is a continuation of U.S. patent application Ser. No. 18/008,441 filed Dec. 5, 2022, which is a national phase entry of PCT/CA2021/050766 filed Jun. 4, 2021 (which designates the U.S.), which claims the benefit of U.S. Provisional Patent Application No. 63/035,298 filed Jun. 5, 2020; the entire contents of each of which are hereby incorporated herein by reference in their entirety.

FIELD OF THE DISCLOSURE

The present disclosure relates to systems and processes for providing safety to persons operating in hazardous environments, and, more particularly, to systems and processes applicable to environments requiring the use of protective clothing and articles.

BACKGROUND OF THE DISCLOSURE

The following paragraphs are provided by way of background to the present disclosure. They are not, however, an admission that anything discussed therein is prior art or part of the knowledge of persons skilled in the art.

In the United States, each year approximately 900,000 work-related eye injuries and approximately 750,000 work-related hand injuries requiring medical attention are reported. It is estimated that in 80% of the reported cases the injury is sustained by a person not wearing appropriate protective clothing or articles, such as safety helmets, gloves, face shields, boots, and so forth (see, for example: http://www.preventblindness.org/ten-ways-prevent-eye-injuries-work, and http://www.ishn.com/articles/94029-drive-home-the-value-of-gloves—hand-injuries-send-a-million-workers-to-ers-each-year). There is, beyond the obvious personal impact resulting from such injuries, a significant medical cost associated with injury treatment. It is, therefore, highly desirable to reduce the number of reported workplace injuries by improving the precautionary safety measures taken by workplace personnel as they operate in hazardous work environments.

Therefore, there exists in the art a need for systems and processes to reduce injuries to persons working in hazardous environments. An automated system that is capable of accurate and continuous monitoring of the use of personal protective equipment, and can readily be implemented in a wide variety of work spaces is particularly desirable.

SUMMARY OF THE DISCLOSURE

The following paragraphs are intended to introduce the reader to the more detailed description that follows and not to define or limit the claimed subject matter of the present disclosure.

In one broad aspect, the present disclosure relates to a system and process for monitoring use of personal protective equipment. Accordingly, the present disclosure provides, in at least one aspect, in at least one implementation, a system for automatic monitoring of the use of personal protective equipment by workers in a work space, the system comprising:

a plurality of barcodes, each barcode being associated with a unique personal protective equipment item and comprising object information identifying the associated personal protective equipment item and user information for a given worker who uses the personal protective equipment item;

first and second image sensors installable in the work space, where the first and second image sensors are spaced apart from one another and located to cover different first and second field of views, respectively, the first and second field of views overlapping in a given area in the work space, and the first and second image sensors being adapted to collectively capture a first plurality of images of the given area; and a central controller that is coupled to the first and second image sensors, the central controller comprising at least one processor and a memory element comprising a database configured to store the plurality of barcodes and the user information so that one or more barcodes are linked with the user information of the given worker;

the at least one processor and the first and second image sensors together being configured to:

(i) detect a human form object in the first plurality of images;

(ii) identify a second plurality of images from the first plurality of images where the second plurality of images include the detected human form object;

(iii) detect a first barcode object in at least one of the second plurality of images where the first barcode object is associated with the detected human form object;

(iv) identify a first barcode corresponding with the detected first barcode object;

(v) perform a search in the database using the first barcode to identify the user information linked therewith and additional barcodes linked with the identified user information;

(vi) detect additional barcode objects, in the second plurality of images, that correspond with the identified additional barcodes;

(vii) apply a probabilistic algorithm to compute the probabilities that the worker corresponding with the detected human form object is wearing each personal protective equipment item associated with the first detected barcode and the additional identified barcodes in accordance with the safety rules applicable to the work space, the probabilistic algorithm being applied to determine a prevalence of each barcode object corresponding to the first detected barcode and the additional barcodes in the second plurality images; and (viii) execute a safety action for each of the first detected barcode and additional barcode objects with computed probabilities that are lower than a predetermined probability threshold value.

In at least one implementation, any of the barcode objects can be detected in defined image regions in the second plurality of images, where each defined image region is constructed to include the detected human form object.

In at least one implementation, the first plurality of images can comprise a first set of temporally sequential images captured by the first image sensor during a given period of time and a second set of temporally sequential images captured by the second image sensor during the given period of time.

In at least one implementation, the given period of time can be from about 5 to about 60 seconds.

In at least one implementation, the first and second set of images each include at least 10 images.

In at least one implementation, the first and second image sensors are spaced apart and angled so that an intersection between a first axis and a second axis that centrally extend through the fields of view of the first image sensor and the second image sensor, respectively, form an angle that ranges between about 15 degrees and about 175 degrees, or between about 205 degrees and about 345 degrees.

In at least one implementation, the angle can range between about 30 degrees and about 150 degrees, or between about 210 degrees and about 330degrees.

In at least one implementation, the human form object can be detected by applying a human form object image analysis algorithm to the first plurality of images.

In at least one implementation, the barcode object can be detected by applying a barcode object image analysis algorithm to the second plurality of images.

In at least one implementation, the defined image region can be constructed using a frame with image boundaries to encompass an entirety of the detected human form object in the frame, and the image boundaries are formed so that there is no contact between the detected human form object and the image boundaries.

In at least one implementation, the image boundaries can correspond with a distance of from about 0.5 meter to about 3 meters away from the detected human form object in the image region.

In at least one implementation, the central controller is coupled to an input device, the input device being configured to receive user entry in the form of a query barcode, the central controller and the first and second image sensors being further configured to detect a plurality of barcode objects and read barcodes corresponding to the detected barcode objects in each of the first and second plurality of images and to store the read barcodes in a second database configured to store a plurality of read barcodes and images together with the time the images are captured by the first and/or second image sensor by using a linked relationship so that one or more read barcodes are linked with one of the images and the time the images are captured by the first and/or second image sensor, and the central controller is further configured to determine when there is a match between the query barcode and one of the read stored barcodes.

In at least one implementation, the central controller can be coupled to an output device, and the central controller is further configured to provide an output to the output device when the query barcode is identical to a detected read barcode.

In at least one implementation, the output can include a time indicator corresponding with the time at which the image that is linked to the stored barcode that is matched to the query barcode was captured by the first and/or second image sensor.

In at least one implementation, the output can include the image that is linked to the stored barcode that is matched to the query barcode.

In at least one implementation, the output can comprise a time indicator that indicates the time at which the image linked to the stored barcode that is identical to the query barcode was captured by the first and/or second image sensor and/or or the output can comprise the image linked to the stored barcode that is identical to the query barcode, wherein the time indicator or the linked image corresponds with a most recent time at which a match between the query barcode and the read stored barcode was identified, relative to the time the query barcode was entered.

In at least one implementation, the input device can additionally be configured to receive entry by a user of a query time period defined by a first time and a second time, and the central controller is configured to detect the plurality of barcode objects and barcodes corresponding therewith in the first and second plurality of images captured by the first and/or second image sensor during the query time period.

In at least one implementation, the system additionally can comprise a plurality of barcodes associated with objects other than personal protective items, the barcodes comprising object information identifying the objects.

In a further aspect, the present disclosure provides, in at least one implementation, an automated process for monitoring use of personal protective equipment by workers in a work space, the process comprising:

- obtaining a first plurality of images using first and second image sensors installable in the work space, where the first and second image sensors are spaced apart from one another and located to cover different first and second field of views, respectively, and the first and second field of views overlap in a given area in the work space;
- detecting a human form object of a given worker in the first plurality of images;
- identifying a second plurality of images from the first plurality of images where the second plurality of images include the detected human form object;
- detecting a first barcode object in at least one of the second plurality of images where the first barcode object is associated with the detected human form object;
- identifying a first barcode corresponding with the detected first barcode object;
- performing a search in a database using the first barcode to identify the user information linked therewith and additional barcodes linked with the identified user information where the database stores a plurality of barcodes and user information using a linked relationship so that one or more barcodes are linked with the user information of the workers;
- detecting additional barcode objects in the second plurality of images, that correspond with the identified additional barcodes;
- applying a probabilistic algorithm to compute probabilities that the given worker corresponding with the detected human form object is wearing each personal protective equipment item associated with the first detected barcode and the additional identified barcodes in accordance with safety rules applicable to the work space, the probabilistic algorithm being applied to determine a prevalence of each barcode object corresponding to the first detected barcode and the additional barcodes in the second plurality of images; and
- executing a safety action for each of the first detected barcode and additional barcode objects with computed probabilities that are lower than a predetermined probability threshold value.

In at least one implementation, any of the barcode objects can be detected in defined image regions in the second plurality of images, where each defined image region is constructed to include the detected human form object.

In at least one implementation, the first plurality of images can include a first set of temporally sequential images captured by the first image sensor during a given period of time and a second set of temporally sequential images captured by the second image sensor during the given period of time.

In at least one implementation, the given period of time can be from about 5 to about 60 seconds.

In at least one implementation, the first and second set of images can each include at least 10 images.

In at least one implementation, the first and second image sensors are spaced apart and angled so that an intersection between a first axis and a second axis that centrally extend through the fields of view of the first image sensor and the second image sensor, respectively, form an angle that ranges between about 15 degrees and about 175 degrees, or between about 205 degrees and about 345 degrees.

In at least one implementation, the angle can range between about 30 degrees and about 150 degrees, or between about 210 degrees and about 330 degrees.

In at least one implementation, the human form object can be detected by applying a human form object image analysis algorithm to the first plurality of images.

In at least one implementation, the barcode object can be detected by applying a barcode object image analysis algorithm to the second plurality of images.

In at least one implementation, the defined image region can be constructed using a frame with image boundaries to encompass an entirety of the detected human form object in the frame, and the image boundaries are formed so that there is no contact between the detected human form object and the image boundaries.

In at least one implementation, the image boundaries can correspond with a distance of from about 0.5 meter to about 3 meters away from the detected human form object in the image region.

In at least one implementation, the central controller can be coupled to an input device, the input device being configured to receive a user entry that includes a query barcode, and the central controller and the first and second image sensors being further configured to read a plurality of barcode objects and barcodes corresponding therewith in each of the first and second plurality of images and to store the read barcodes in a second database configured to store a plurality of read barcodes and images together with the time the images were captured by the first and/or second image sensor by using a linked relationship so that one or more read barcodes are linked with an image from which the one or more read barcodes were obtained and the time the given image was captured by the first and/or second image sensor, and the central controller is further configured to determine if there is a match between the query barcode and one of the read stored barcodes.

In at least one implementation, the central controller can be coupled to an output device, the central controller being configured to provide output to the output device when the query barcode is identical to a read stored barcode.

In at least one implementation, the output can include a time indicator corresponding with the time at which the image that is linked to the barcode that is identical to the query barcode was captured by the first and/or second image sensor.

In at least one implementation, the output can include the image comprising the barcode that is identical to the query barcode and was captured by the first and/or second image sensor.

In at least one implementation, the output can includes a time indicator indicating a time when the image that is linked to the barcode that is matched to the query barcode was captured by the first and/or second image sensor and/or the image that is linked to the barcode that is matched to the query barcode, wherein the time indicator or the image corresponds with a most recent time at which a match between the query barcode and one of the read stored barcodes was made, relative to a time that the query barcode was received from the user.

In at least one implementation, the input device can additionally be configured to receive entry from the user of a query time period defined by a first time and a second time, and the central controller is configured to detect the plurality of barcode objects and barcodes corresponding therewith in a set of images captured by the first and/or second image sensor during the query time period.

In at least one implementation, the system can additionally comprise a plurality of barcodes associated with objects other than personal protective items, the barcodes comprising object information identifying the objects.

Other features and advantages of the present disclosure will become apparent from the following detailed description. It should be understood, however, that the detailed description, while indicating some example implementations of the disclosure, are given by way of illustration only, since various changes and modifications within the spirit and scope of the disclosure will become apparent to those of skill in the art from the detailed description.

BRIEF DESCRIPTION OF THE DRAWINGS

The disclosure is in the hereinafter provided paragraphs described, by way of example, in relation to the attached figures. The figures provided herein are provided for a better understanding of the example implementations and to show more clearly how the various implementations may be carried into effect. The figures are not intended to limit the present disclosure.

DETAILED DESCRIPTION

Figure 1:
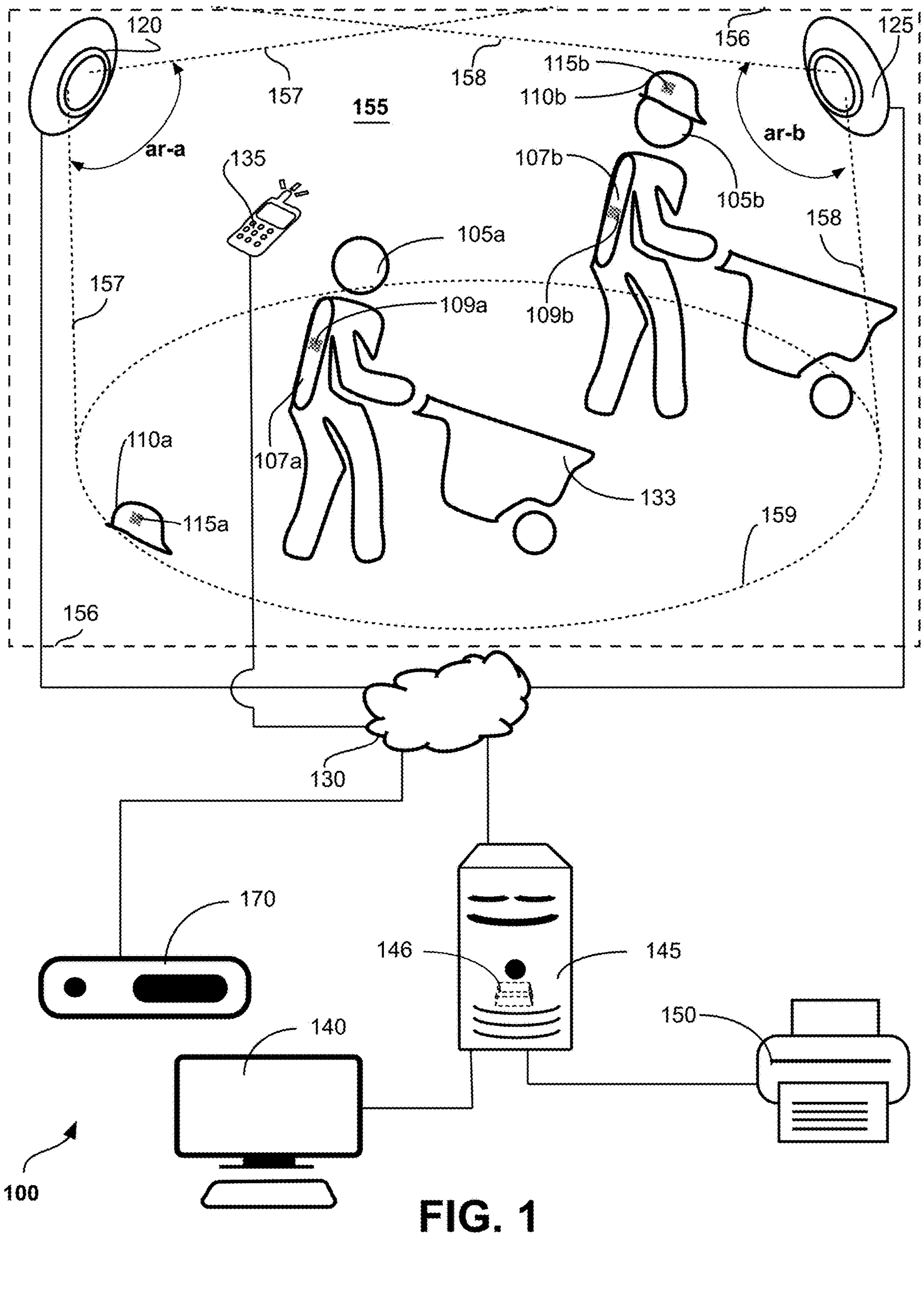
FIG. 1 is a schematic view of a system for monitoring the use of personal protective equipment according to an example implementation of the present disclosure.

Various systems and processes will be described below to provide an example of an implementation or implementation of each claimed subject matter. No implementation described below limits any claimed subject matter and any claimed subject matter may cover methods, systems, devices, assemblies, processes or apparatuses that differ from those described below. The claimed subject matter is not limited to systems or processes having all of the features of any one system, method, device, apparatus, assembly or process described herein or to features common to multiple or all of the systems, methods, devices, apparatuses, assemblies or processes described herein. It is possible that a system or process described herein is not an implementation or implementation of any claimed subject matter. Any subject matter disclosed in a system or process described herein that is not claimed in this document may be the subject matter of another protective instrument, for example, a continuing patent application, and the applicants, inventors or owners do not intend to abandon, disclaim or dedicate to the public any such subject matter by its disclosure in this document.

As used herein and in the claims, the singular forms, such as "a", "an" and "the" include the plural reference and vice versa unless the context clearly indicates otherwise. Throughout this specification, unless otherwise indicated, the terms "comprise," "comprises" and "comprising" are used inclusively rather than exclusively, so that a stated integer or group of integers may include one or more other non-stated integers or groups of integers.

The term "or" is inclusive unless modified, for example, by "either".

When ranges are used herein, such as for geometric parameters or example distances, all combinations and sub-combinations of ranges and specific implementations therein are intended to be included. Other than in the operating examples, or where otherwise indicated, all numbers expressing quantities of ingredients or reaction conditions used herein should be understood as modified in all instances by the term "about." The term "about" when referring to a number or a numerical range means that the number or numerical range referred to is an approximation within acceptable experimental variability (or within statistical experimental error), and thus the number or numerical range may vary between 1% and 15% of the stated number or numerical range, as will be readily recognized by context. Furthermore any range of values described herein is intended to specifically include the limiting values of the range, and any intermediate value or sub-range within the given range, and all such intermediate values and sub-ranges are individually and specifically disclosed (e.g. a range of 1 to 5 includes 1, 1.5, 2, 2.75, 3, 3.90, 4, and 5). Similarly, other terms of degree such as "substantially" and "approximately" as used herein mean a reasonable amount of deviation of the modified term such that the end result is not significantly changed. These terms of degree should be construed as including a deviation of the modified term if this deviation would not negate the meaning of the term it modifies.

Unless otherwise defined, scientific and technical terms used in connection with any formulations described herein shall have the meanings that are commonly understood by those of ordinary skill in the art. The terminology used herein is for the purpose of describing particular implementations only, and is not intended to limit the scope of the teachings herein, which is defined solely by the claims.

All publications, patents and patent applications are herein incorporated by reference in their entirety to the same extent as if each individual publication, patent or patent application was specifically and individually indicated to be incorporated by reference in its entirety.

Definitions

The terms "automated system" or "system", as used interchangeably herein, refers to a device, or a configuration of a plurality of devices, with one or more electronic processing elements such as hardware logic including one or more processors, application specific integrated circuits (ASICs), graphics processing units (GPUs), and field programmable gate arrays (FGPAs) capable of performing non-compiled or compiled (i.e. machine executable) instructions, and such devices include, but are not limited to, any personal computer, desktop computer, hand-held computer, laptop computer, tablet computer, cell phone computer, smart phone computer or other suitable electronic device, or plurality of devices.

A portion of the example implementations of the systems, devices, or methods described in accordance with the teachings herein may be implemented as a combination of hardware or software. For example, a portion of the implementations described herein may be implemented, at least in part, by using one or more computer programs, executing on one or more programmable devices (i.e. computing device) each comprising at least one processing element, and at least one data storage element (including volatile and non-volatile memory). These devices may also have at least one input device and at least one output device as defined herein.

It should also be noted that there may be some elements that are used to implement at least part of the implementations described herein that may be implemented via software that is written in a high-level procedural language such as object-oriented programming. The program code may be written in MATLAB™, Visual Basic, Fortran, C, C++, or any other suitable programming language and may comprise modules or classes, as is known to those skilled in object-oriented programming. Alternatively, or in addition thereto, some of these elements implemented via software may be written in assembly language, machine language, or firmware as needed.

At least some of the software programs used to implement at least one of the implementations described herein may be stored on a storage media (e.g. a computer readable medium such as, but not limited to, read-only memory (ROM), magnetic disk, optical disc) or a device that is readable by a general or special purpose programmable device. The software program code, when read by at least one processor of the programmable device, configures the at least one processor to operate in a new, specific and predefined manner in order to perform at least one of the methods described herein.

Furthermore, at least some of the programs associated with the systems and methods of the implementations described herein may be capable of being distributed in a computer program product comprising a computer readable medium that bears computer usable instructions, such as program code or program instructions, for one or more processors. The program code may be preinstalled and embedded during manufacture and/or may be later installed as an update for an already deployed computing system. The medium may be provided in various forms, including non-transitory forms such as, but not limited to, one or more diskettes, compact disks, tapes, chips, Universal Serial Bus (USB) keys, external hard drives, magnetic and electronic media storage, tablet (e.g. iPad) or smartphone (e.g. iPhones) apps, and the like, for example. In alternative implementations, the medium may be transitory in nature such as, but not limited to, wire-line transmissions, satellite transmissions, internet transmissions (e.g. downloads), media, as well as digital and analog signals, for example. The computer useable instructions may also be in various formats, including compiled and non-compiled code.

In one aspect, the present disclosure includes a computer readable medium comprising a plurality of instructions that are executable on a processing unit of a device for adapting the device to implement a process for monitoring the use of personal protective equipment according to any of the implementations of the processes described herein.

The term “barcode”, as used herein, refers to any item or image containing optically decodable or identifiable indicia. A common type of barcode, for example, includes a linear barcode, also referred to as a one-dimensional (1D) barcode, wherein such a barcode represents information by varying the width, height and/or spacing of a plurality of parallel lines in the barcode. Another common type of barcode includes a matrix barcode, also referred to as a two-dimensional barcode (2D), wherein such a barcode represents information using geometric patterns, such as rectangles, dots, hexagons or other geometric patterns spaced in two dimensions.

The term “barcode object”, as used herein, refers to an image of a barcode corresponding with a real barcode.

The term “coupled”, as used herein, can have several different meanings depending on the context in which the term is used. For example, the term coupled can have a mechanical or electrical connotation depending on the context in which it is used, i.e. whether describing a physical layout or transmission of data as the case may be. For example, depending on the context, the term coupled may indicate that two elements or devices can be directly physically or electrically connected to one another or connected to one another through one or more intermediate elements or devices via a physical or electrical element such as, but not limited to, a wire, a non-active circuit element (e.g. resistor) and the like, for example.

The phrase “executing a safety action”, as used herein, refers to an automated system or a component of the automated system executing an action to enhance the safety of a user of the system. This includes immediate near term action, such as emitting an alert signal, or longer term action, including, for example providing a safety report, or safety training related information.

The term “human form”, as used herein, refers to a shape which uniquely corresponds with the shape of a person or a part thereof such as, for example, a face or a hand.

The term “human form object”, as used herein, refers to an image of a person corresponding with a real person, or an image of a portion of a person such as, for example, a face or a hand that corresponds with a portion of a real person. In general, in the context of the present disclosure, human form objects may be present in images, such as workplace images. In general, work space images may comprise one or more human form objects, and/or one or more non-human form objects. The images correspond with a reality, such that, for example, a workplace image corresponds with a real workplace.

The term “input device”, as used herein, refers to any user operable device that is used to input information and includes but is not limited to, one or more of a terminal, a touch screen, a keyboard, a mouse, a mouse pad, a tracker ball, a joystick, a microphone, a voice recognition system, a light pen, a camera, a data entry device, such as a barcode reader or a magnetic ink character recognition device, sensor, or any other computing unit capable of receiving input data. Input devices may comprise a two dimensional display, such as a TV, or a liquid crystal display (LCD), or a light-emitting diode (LED) backlit display, a mobile telephone display, or a display that is capable of receiving input from a user e.g. by touch screen.

The user in accordance herewith may be any user or operator including, for example any safety manager, or work site operator or manager.

The term “non-human form” refers to a shape which corresponds to any or all shapes other than those shapes that uniquely correspond with a person or a part of a person.

The term “non-human form object” refers to an image of a shape which corresponds with a real object, excluding, however a real person or a portion thereof.

The term “output device”, as used herein, refers to any device that is used to output information and includes, but is not limited to, one or more of a display terminal, a screen, a printer (e.g. laser, inkjet, dot matrix), a plotter or other hard copy output device, a speaker, headphones, an electronic storage device, a buzzer or vibrator, a radio or other communication device, that may communicate with another device, or any other computing unit. Output devices may also comprise a two dimensional display, such as a television, or a LCD, or a LED backlit display, and/or a mobile telephone display, capable of providing output data in a user viewable format.

The term “input/output device”, as used herein, refers to any device that can be used both as an input device and an output device by virtue of inclusion in the device of both input and output functions.

The terms “personal protective equipment” or “PPE” are used interchangeably herein, and refer to any equipment, instrument or article capable of reducing the risk of injuries or bodily damage to a person, e.g. eye injuries, hand injuries, foot injuries and other forms of bodily harm, as a result of incidents, accidents and/or injuries including incidents in a workplace. The PPE include, without limitation, protective articles such as a safety helmet, safety gloves, safety glasses or safety goggles, safety footwear, a face shield or face mask, hearing protection devices, a protective vest or protective jacket, a safety suit or safety gown, a gas tank and/or breathing apparatus, and safety footwear. The PPE also includes devices used for protection such as, but not limited to, a radiation dosimetry device, a noise measurement device, and/or a light intensity measurement device for measuring light in the visible range or another wavelength range. These terms are further intended to include protective gear worn in workplaces where there are risks of contamination of work objects by direct human contact with such objects, such as protective articles and instruments used in, for example, electronics manufacturing, or pharmaceutical or biologics manufacturing.

General Implementation of the System

As hereinbefore mentioned, the present disclosure relates to systems and processes for monitoring the use of personal protective equipment. The automated system and processes can be implemented in a manner that fosters strong compliance with the safety regulations and guidelines applicable in a work space, such as in a hazardous work environment. The system may be configured to accurately and continuously or periodically monitor and ascertain whether a person is wearing one or more personal protective equipment items while present in the hazardous work environment. The system of the present disclosure is capable of simultaneously monitoring multiple persons, for example 10 or 20 persons, at a work space, each person wearing multiple personal protective equipment items, for example, 5 or 10 of such items.

When the system detects a personal protective equipment item that is not being worn by a person, the system can execute a safety action, such as emitting a safety alert. The system of the present disclosure is sufficiently sensitive to readily detect, in a relatively brief period of time duration, separation between a user and a personal protective equipment item (for example, 10 seconds) and/or a physical separation between a user and the personal protective equipment across a relative short distance (for example, 1 m). The herein disclosed system, therefore, is suitable for flexible use in many environments, including rapidly altering or temporary work spaces, such as construction sites. The processes and system are free of sensors worn by the user, i.e. the system does not involve the use of wearable sensors, such as photoelectric sensors or pressure sensors, to monitor whether protective equipment is worn by a user. Thus, the system is not susceptible to sensor malfunction or sensitive to slight adjustments a user wearing the personal protective equipment may make from time to time, or external factors such as weather, all of which can interfere with functioning of wearable sensors which may result in the generation of false alarms. The system also does not require custom fitting as may be required for wearable sensor-based systems. These and other beneficial aspects, render the herein disclosed system useful in preventing the occurrence of work related injuries.

In broad terms, the system for automatic monitoring of the use of one or more pieces of personal protective equipment includes a plurality of barcodes, each barcode being associated with an item of personal protective equipment, as well as user information for a user of the item of personal protective equipment. Image sensors are installed in a work space and capture images of the work space in which users wearing the personal protective equipment are present. The system is configured to detect human form objects (corresponding with the users of the personal protective equipment) and barcode objects (corresponding with the barcode) in the images. Based on the detected human form objects and barcode objects, a probabilistic algorithm is used to compute the probability that at the time the images were captured, any users in the images were wearing all personal protective equipment in accordance with the safety rules applicable to the work space. The system is further configured to execute a safety action when the computed probability is lower than a predetermined probability threshold value.

In what follows selected embodiments are described with reference to the drawings.

Figure 9A:
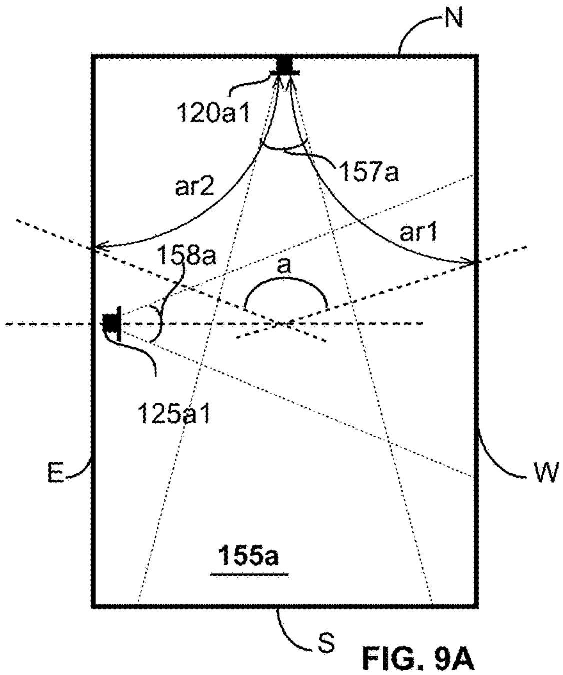
FIGS. 9A, 9B, 9C, and 9D are schematic overhead views of work spaces as well as first and second sensors positioned therein, according to various example implementations of the present disclosure.
Figure 10:
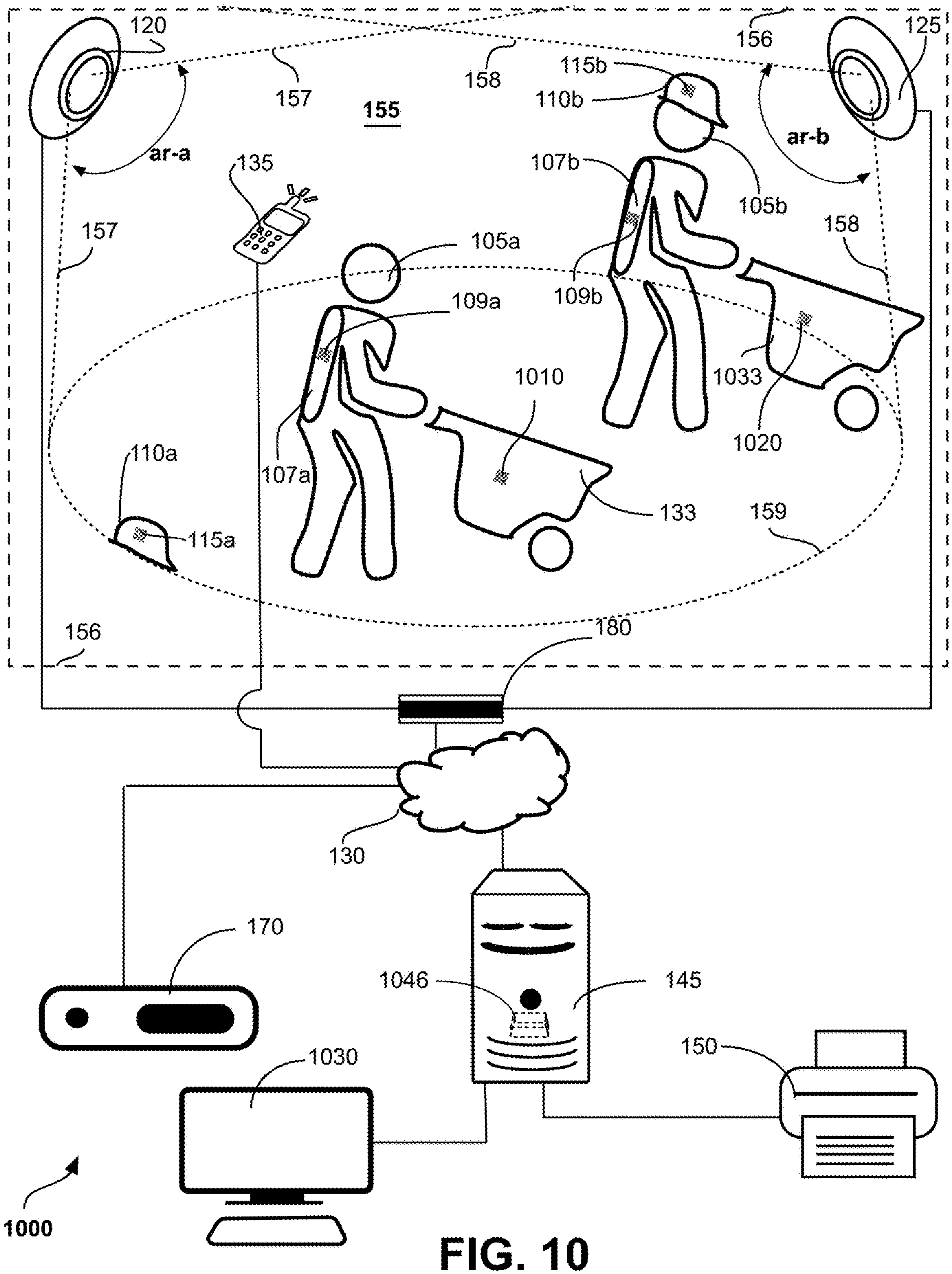
FIG. 10 is a schematic view of another system for monitoring the use of personal protective equipment according to an alternative example implementation of the present disclosure.
Figure 11A:
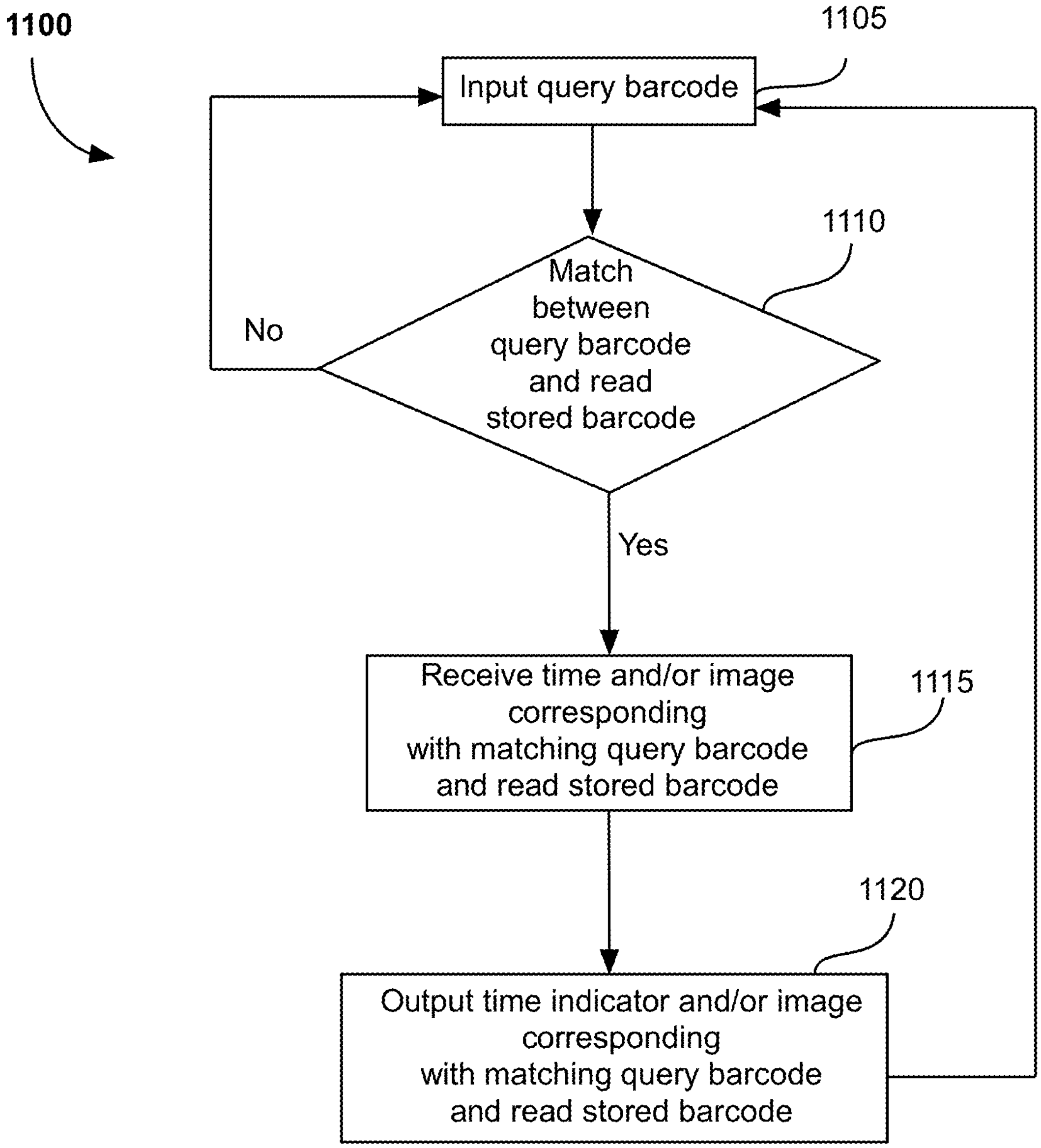
FIGS. 11A and 11B are flow charts of processes for tracking the use of personal protective equipment and non-personal protective equipment according to alternative example implementations of the present disclosure.
Figure 11B:
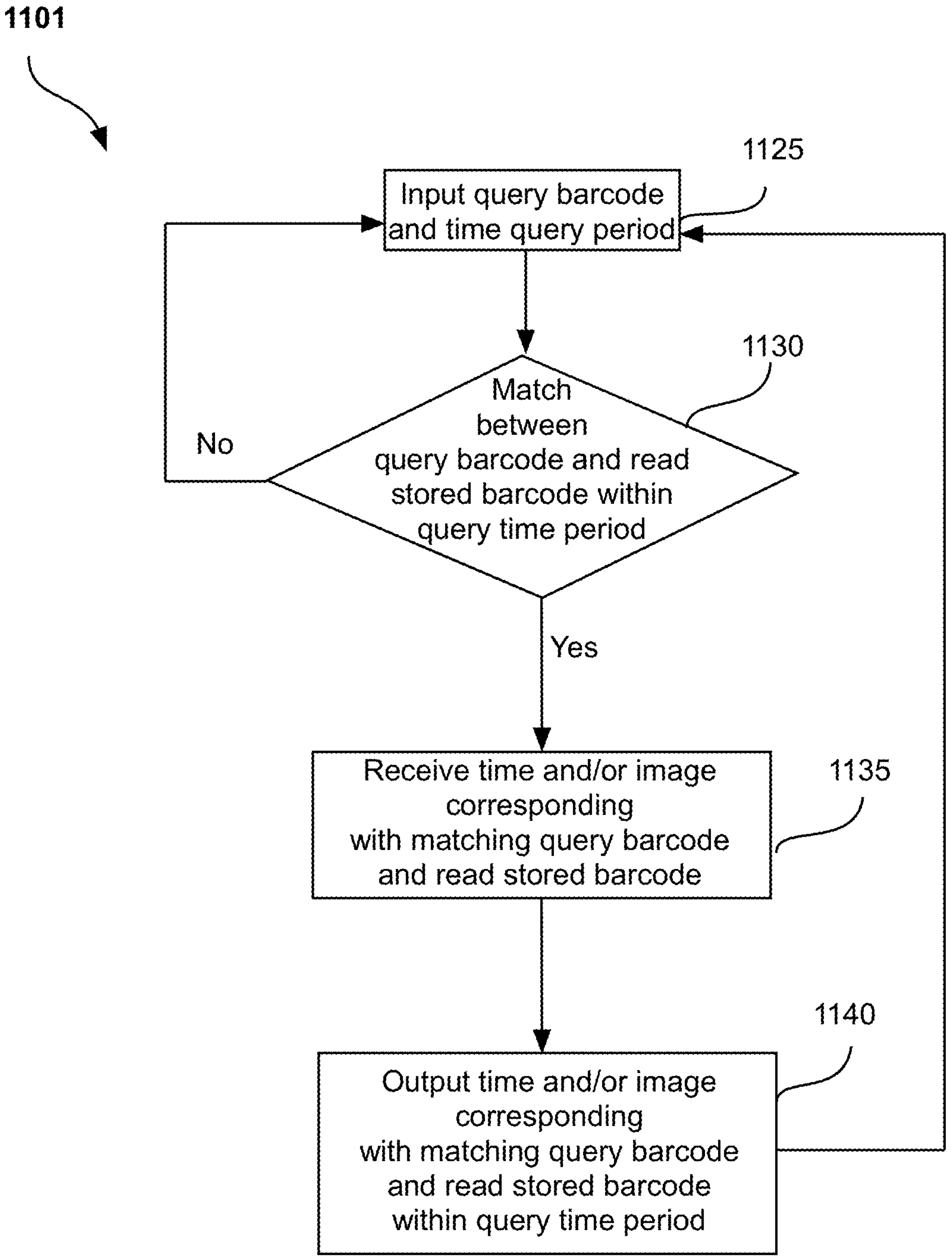

In general overview, FIGS. 1, 3, 4, 5A, 5B, and 5C are schematic views of various hardware components and configurations of systems according to example implementations of systems of the present disclosure. FIG. 2 is a flow chart diagram of an example embodiment of an automated process of the present disclosure. FIGS. 6A, 6B, 7A, 7B, 7C, 7D, 7E, 7F, 8A, 8B, 8C, 8D, 8E, and 8F are example illustrations of images captured by image sensors according to example implementations of systems of the present disclosure. FIGS. 9A, 9B, 9C, and 9D are schematic overviews of example image sensor installations according to example implementations of systems of the present disclosure. FIG. 10 is a schematic view of various hardware components and configurations of systems according to alternative example implementation and FIGS. 11A and 11B are flow chart diagrams of alternative example embodiments of an automated process of the present disclosure.

Figure 2:
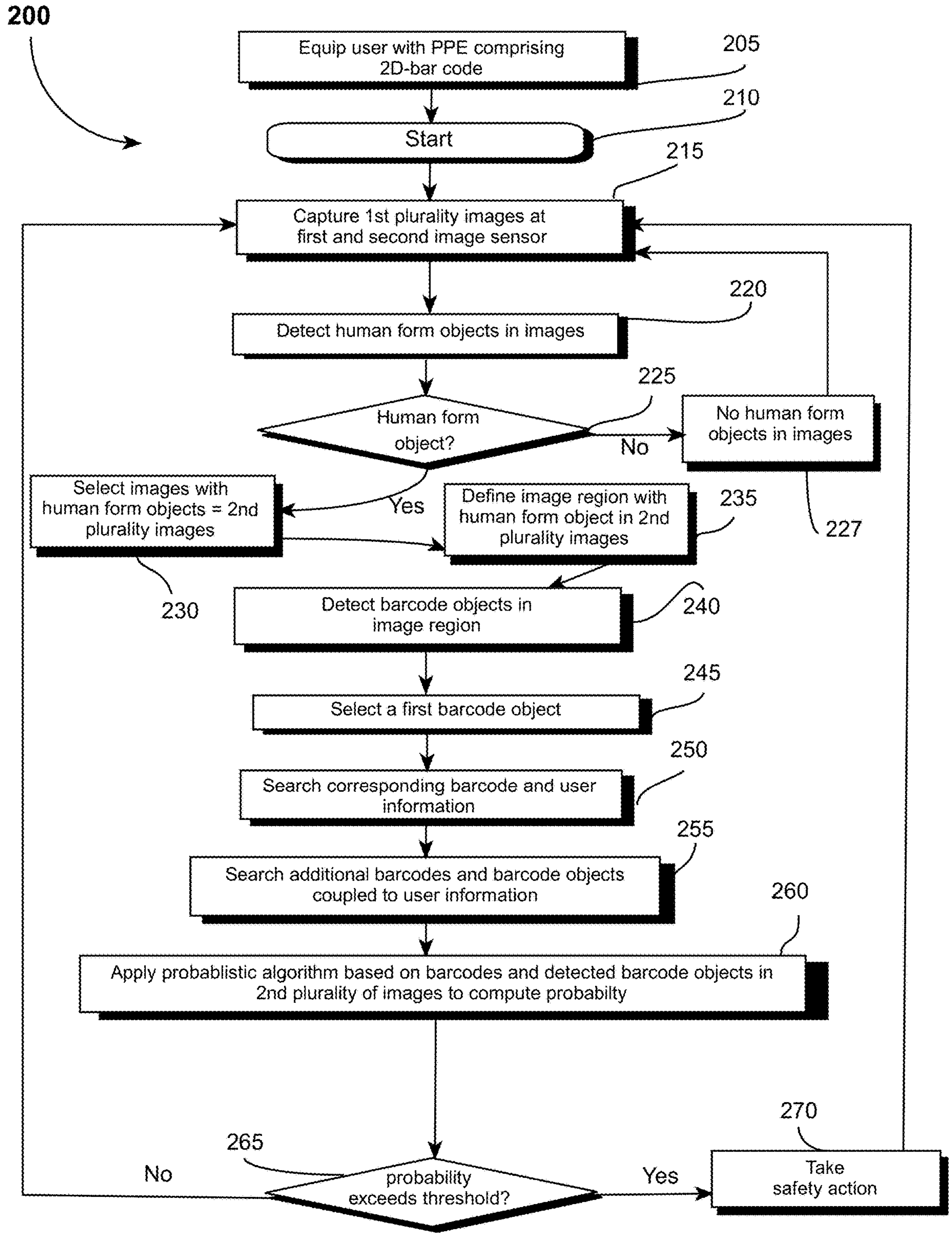
FIG. 2 is a flow chart of a process for monitoring the use of personal protective equipment according to an example implementation of the present disclosure.

Referring initially to FIG. 1, the present disclosure provides, in an example implementation, a system 100 for use in conjunction with personal protective equipment. System 100 permits automatic monitoring of the use of a plurality of personal protective equipment by a plurality of workers in a work space. The plurality of personal protective equipment is illustrated by safety helmets 110*a* and 110*b*, and safety vests 107*a* and 107*b*. It is to be understood that safety helmets 110*a* and 110*b*, and safety vests 107*a* and 107*b* represent examples of personal protective equipment. Other examples of personal protective equipment include, without limitation, at least one of safety gloves, safety footwear, safety suits, safety goggles, safety masks, and hearing protection devices, for example, which are all not shown but may, additionally or alternatively, be detected and monitored by the here disclosed system 100. Each of the personal protective equipment 107*a*, 107*b*, 110*a*, and 110*b* is separately tagged, permanently or detachably, with barcodes 109*a*, 109*b*, 115*a*, and 115*b*, respectively, by adhering or attaching the barcodes 109*a*, 109*b*, 115*a*, 115*b*, to the personal protective equipment 107*a*, 107*b* 110*a*, and 110*b*, respectively. Barcodes 109*a*, 109*b*, 115*a*, and 115*b* in various implementations can be 1D-barcodes or 2D-barcodes, for example a QR Code, a Data Matrix, a Maxicode or a PDF417, or combinations of 1D-barcodes and 2-D barcodes. It is noted that individual barcodes are generally selected to be unique to each personal protective equipment item, so that not only different classes of personal protective equipment (e.g. the classes of safety gloves, safety masks), but also individual personal protective equipment items within a given class of personal protective equipment (e.g. multiple safety gloves) carry a unique barcode. Thus, an image of a barcode can be said to represent object information for a personal protective equipment item allowing the identification of the specific personal equipment item, e.g. a specific safety helmet, or specific safety vest, e.g. safety vest 107*a* and safety vest 107*b* can be separately identified. Shown in FIG. 1, by way of example only, are 2D-barcodes. However, 1D-barcodes can be preferred in implementations involving physical adherence of the barcode to curved or curving surfaces of a protective instrument, or in implementations involving less sensitive or fewer sensors, since 1D-barcodes can be less sensitive to image distortion than 2D-barcodes. Alternatively, 2-D barcodes can be preferred in implementations in which it is desirable to include more information in the barcode. Furthermore, in implementations in which image data is recorded, as further described below, it may be easier to correct acquired image data having some erroneous information of 2D barcodes in view of the fact that 2-D bar codes comprise more information that can be used to reconstruct any erroneous information in the acquired image data.

Continuing to refer to FIG. 1, system 100 is installed in work space 155, defined by work space perimeter 156, and workers 105*a* and 105*b* who work in work space 155 are required to wear their respective safety helmets 110*a* and 110*b* comprising barcodes 115*a* and 115*b*, respectively, and their respective safety vests 107*a* and 107*b* comprising barcodes 109*a* and 109*b*, respectively, in accordance with the applicable safety rules for work space 155. It is noted that by virtue of the uniqueness of barcodes 109*a*, 109*b*, 115*a*, and 115*b*, it is possible to distinguish worker 105*a* from worker 105*b*. In some implementations, work space 155 can be a permanent work space, for example, a warehouse, a manufacturing facility, or a laboratory. In other implementations, work space 155 can be a temporary work space, such as a construction site. In yet other implementations, work space 155 can be a relatively small space around an individual piece of hazardous equipment, e.g. a space around a forklift, a circle saw, etc.

System 100 further comprises first and second image sensors 120 and 125, respectively, installed in a spaced apart fashion in work space 155. Furthermore, first and second image sensors 120 and 125 are angled, (as hereinafter described with reference to FIGS. 9A-9D), so that from first and second angles of view (see: double headed arrows ar-a and ar-b, for image sensor 120 and 125, respectively, and ar1 and ar2 in FIG. 9A showing a range of possible angles from which an angle for image sensor 120*a*1 may be selected for mounting the image sensor 120*a*1), respectively, images of a certain area 159 in work space 155 can be captured by image sensors 120 and 125. Furthermore, first and second image sensors 120 and 125 are configured to continuously or periodically capture temporally successive images of area 159 in work space 155.

In some implementations, first and second image sensors 120 and 125 can be a camera, for example, an internet protocol (IP) camera, either with or without image processing capabilities, including e.g. a camera having a shutter speed of at least about 1/60 seconds, to allow for motion blur control, and the ability to record an image stream having a resolution of, for example, about 1,920×1,080 pixels at a sampling rate of about 3 to 5 frames per second, or to record two image streams, for example a first image stream having a resolution of, for example, about 1,920×1,080 pixels at a sampling rate of about 3 to 5 frames per second, and a second image stream having a resolution of, for example, about 1,280×720pixels at a sampling rate of 12 to 24 frames per second. A camera that provides two image streams can be used to perform image processing analysis of a first image stream, as hereinafter further described, and recording of a second image stream. Image sensors 120 and 125 may further be selected to be operable within a temperature range that can occur in work space 155, for example −30° C. to +50° C.

In various implementations, image sensors that can be used can further include, for example, at least one of digital cameras (still or motion), Light Detection and Ranging (LIDAR) based sensors, or Time-of-Flight (ToF) based sensors. ToF-based sensors may be useful in the implementation of first or second sensor image sensor 120 and 125, as they permit spatial resolution of distance between the camera and an object that is imaged for each point in the image in three-dimensions, and thus can enhance the ability to distinguish between human form objects and their shadows. Image sensors that can be used can further include, for example, at least one of infrared (IR) based sensors, including, but not limited to, passive IR (PIR) sensors, deep-IR based sensors, or ToF IR-based sensors. In this respect, deep-IR based sensors may be useful in the implementation of first and second sensors 120 and 125, as they can permit the identification of a human form object within a thermal image based on the detection and evaluation of temperature patterns within the thermal image. Notably, images of a human form object displaying a temperature of about 37° C. can be distinguished from a surrounding environment or objects therein having a different temperature using deep-IR based sensors.

Continuing to refer again to FIG. 1, central controller 145, implemented by a computer server, controls the operation of the entire system 100 and is operably coupled to network 130, for example, a wireless network or a local area network (LAN). Central controller 145 is also operably coupled to first and second image sensors, 120 and 125, respectively, via network 130. Central controller 145 comprises central processing unit (CPU) 146 having one or more processors or logic hardware, a memory component, and input and output ports or communication buses allowing for communicative coupling to peripheral input and output devices such as, for example, input device 140 (i.e. a keyboard and/or touch-sensitive screen), or a scanner (not shown). Central controller 145 is further configured to provide output data to an output device, such as printer 150, or to access and update a database or files in a data store (not shown). The data store may be part of the central controller 145 or it may be a separate hardware element.

Central controller 145 can be controlled by an operator through input device 140. In this manner, central controller 145 can be configured to provide or keep track of information relevant to system 100, such as, but not limited to, user-related information, personal protective equipment related information, work site related information, or barcode related information.

In some implementations, a signaling component, illustrated by cell phone 135, can be used as an input device.

In accordance with an aspect hereof, input data includes user information for a given user of the personal protective equipment 107*a*, 107*b*, 110*a*, and 110*b*. Thus, central processing unit 146 can receive user information, such as name, telephone number, birth date, and/or a user ID, for example, of workers 105*a* and 105*b*, and store such information in a database. User information can be included in a barcode. Thus, for example barcodes 109*a* and 115*a* can include a user ID of worker 105*a*, and barcodes 109*b* and 115*b* can include a user ID of worker 105*b*. The database is designed so that for a given user, the user's personal information and all barcodes that are associated with all PPE worn by the user are all linked to each other in the database, in such a fashion that if the database is searched using one of these barcodes, the personal information of the worker who uses PPE items that are associated to the barcode and all other barcodes linked with the same personal information can be identified in the database. The database may be a relational database.

Furthermore, in accordance with an aspect hereof, input data can include safety rules that are applicable to work space 155. Safety rules, as used herein, include the safety-related parameters applicable to a work space and/or personal protective equipment. For example, safety rules can include a safety rule time and/or a safe rule distance, as well as a safety rule action, and can be defined such that if a user is separated from their personal protective equipment by, for example, more than 2 meters (i.e. the safety rule distance) for longer than, for example, 30 seconds (i.e. the safety rule time), the system, will execute a safety rule action, associated with that safety rule, e.g. to generate and emit a signal. Executable safety rule actions include, but are not limited to, alert actions (e.g. generating an audible signal, visual or tactile alerts), and operational actions (e.g. communicating with central processing unit 146, sending of e-mails, or logging data). The safety rules can be stored as safety rules data in the memory of the controller 145 or a data store that are both accessible by the central processing unit 146. Thus, central processing unit 146 is configured to receive safety rules applicable to work space 155 via input device 140 or to access the safety rules data from memory. For example, central processing unit 146 is configured to receive a safety rule that in work space 155, workers present in work space 155 are required to wear a safety helmet and a safety vest. Thus, central processing unit 146 is configured to perform monitoring so that worker 105*a* is required to wear safety vest 107*a* (including barcode 109*a*), and safety helmet 110*a* (including barcode 115*a*), and so that worker 105*b* is required to wear safety vest 107*b* (including barcode 109*b*), and safety helmet 110*b* (including barcode 115*b*), when workers 105*a* or 105*b* are present in work space 155.

Turning now again to first and second image sensors 120 and 125, respectively, first and second image sensors 120 and 125 are spaced apart and angled, in order to capture images of area 159 in work space 155. Consequently images captured by first and second image sensors 120 and 125, correspond, at least in part, with area 159 in work space 155. It is noted, however, that due to the different angles, images captured by first and second image sensors 120 and 125 may reveal or hide different elements present in area 159 of work space 155. Thus, for example an image captured by image sensor 125 may only show part of worker 105*a* since other parts of worker 105*a* may be obscured by the image of worker 105*b*. However, image sensor 120 will capture a different image of worker 105*a* since it has a different field of view of the area 159 compared to image sensor 125.

Figure 9B:
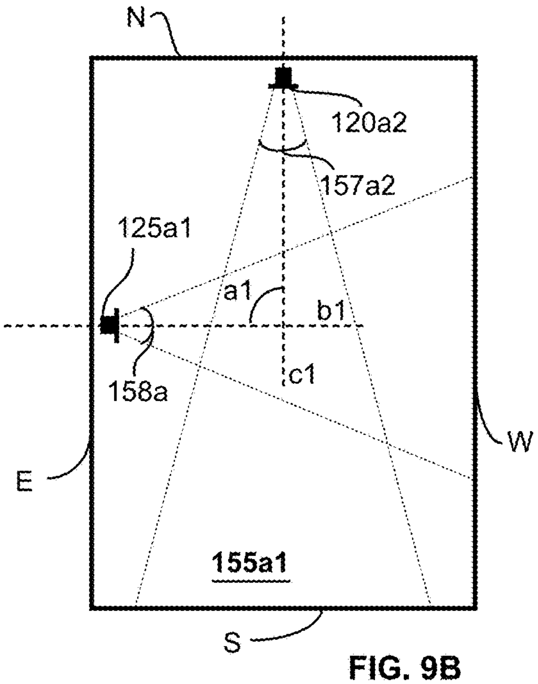
Figure 9C:
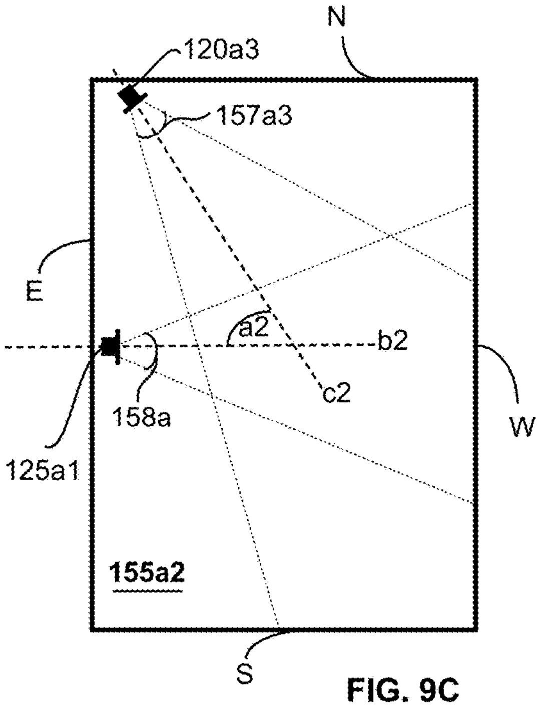
Figure 9D:
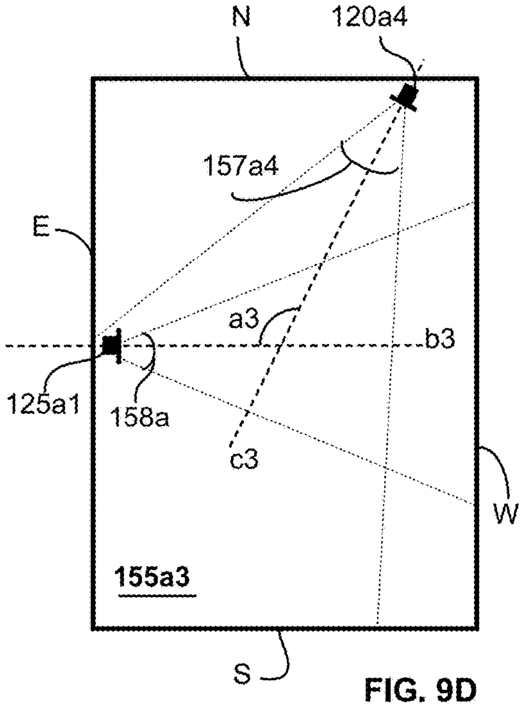

Referring next to FIGS. 9A-9D, shown therein are schematic top views of work spaces 155*a* (FIG. 9A), 155*a*1 (FIG. 9B), 155*a*2 (FIG. 9C) and 155*a*3 (FIG. 9D), with each work space being defined to have a north (N), south(S), west (W), and east (E) wall. It is noted that in the example implementation shown in FIGS. 9A-9D, the work space is defined by walls. In other implementations, one or more of such walls may not be present, and the location of the wall can be thought of as a non-physical perimeter or boundary, beyond which another portion of work space may be situated. Image sensor 125*a*1 is installed on the east (E) wall to capture images of work spaces 155*a*, 155*a*1, 155*a*2 and 155*a*3 at an angle of view 158*a* directed straight to the west (W) wall. Image sensor 120*a* is installed on the north (N) wall, but in other implementations may be installed on the east (E) wall, on the west (W) wall, or on the south(S) wall (not shown). Furthermore, image sensor 120*a* is installed so that angle (a) can be selected to vary, in different implementations, as indicated by arrows (ar1), (ar2). The angle (a) may be referred to as a selected angle that is based on the positioning of the image sensors 120*a*1 and 125*a*1 as it is formed by axes that centrally extend through the angle of view of image sensors 125*a*1 and 120*a*3 and intersect. Thus, by way of example, as illustrated in FIG. 9B, image sensor 125*a*1 and image sensor 120*a*2 can be installed so that angle (a) is selected to be 90 degrees. Angle (a) is now shown as a1 and is formed by axis b1 and c1, that centrally extend through the fields of view 158*a* and 157*a*2, of image sensors 125*a*1 and 120*a*2, respectively, and interest. Thus, by way of another example, as illustrated in FIG. 9C, image sensor 125*a*1 and image sensor 120*a*3 can be installed so that angle (a) is selected to be 45 degrees. Angle (a) is now shown as a2 and is formed by axes b2 and c2, that centrally extend through the fields of view 158*a* and 157*a*3, of image sensors 125*a*1 and 120*a*3, respectively, and intersect. And, by way of yet another example, as illustrated in FIG. 9D, image sensor 125*a*1 and image sensor 120*a*4 can be installed so that angle (a) is selected to be 110 degrees. Angle (a) is now shown as a3 and is formed by axes b3 and c3, that centrally extend through the fields of view 158*a* and 157*a*4, of image sensors 125*a*1 and 120*a*4, respectively, and intersect.

Referring again to FIG. 1, and applying the general principles illustrated by FIGS. 9A-9D thereto, it will be clear that in different implementations, image sensors 120 and 125 can be installed to be angled at a variety of angles independently selected within the range of angles ar-a and ar-b for image sensors 120 and 125, respectively, provided however, that an overlap between the respective fields of views 157 and 158 is created as illustrated in FIGS. 9A-9D. A selected angle can be formed by the intersection of a first axis and a second axis (not shown in FIG. 1 to avoid figure crowding), with the first axis extending centrally through the field of view 157 of image sensor 120 and the second axis centrally extending through the field of view 158 of image sensor 125. In preferred implementations, the angle is selected to range between 15 degrees and 175 degrees, and between 205 and 345 degrees, wherein when the angle is selected to be between 205 and 305 degrees, image sensor 120 is installed on the East (E) or South(S) wall (not shown). In further preferred implementations, the angle is selected to range between 30 degrees and 150 degrees and between 220 and 330 degrees, wherein when the with angle is selected to be between 220 and 330 degrees, image sensor 120 is installed on the East (E) or South(S) wall (not shown). The inventors have found that angles selected within these ranges are particularly effective in the operation of system 100.

In an aspect, the first and second image sensors 120 and 125 are configured together with the central processing unit 146 to analyze the images captured by image sensors 120 and 125 by acquiring the captured images and applying to the captured images a human form object image analysis algorithm to detect in each of the captured images whether there are any human form objects, and by applying to the captured images a barcode object image analysis algorithm to detect in each of the captured images whether there are any barcode objects. It is noted that the phrase "first and second image sensors are configured together with the central processing unit", as used herein, is intended to refer to operably coupled hardware and software components that collectively can execute certain algorithms including the human form object image analysis algorithm and a barcode object image analysis algorithm, i.e. a portion of an algorithm can be carried out by the first sensor, a portion of the algorithm can be carried out by the second sensor and a portion of the algorithm can be carried out by the central processing unit, or a portion of the algorithm may be carried out by only one of the image sensors 120 and 125 and the central processing unit 146 or the algorithms may be carried out by only the central processing unit 146. Accordingly, the portions of the algorithms implemented by the image sensors 120 and 125 and the central processing unit 146 may vary and the hardware and software components are operably coupled so that together they can execute the algorithm on their own or in any combination of the hardware including just one or two of the sensors and the central processing unit. In some implementations, an algorithm may be used that can detect both human form objects and barcode objects. In different implementations, system 100 may be configured so that different portions of the hardware and software components are physically located within the central processing unit 146 or within the first and/or second image sensors 120 and 125. The relative distribution of hardware and software components between the central processing unit 146 and the first and/or second image sensors 120 and 125 may be adjusted for providing different implementations, as desired. Thus, for example, in an implementation, the application of a given image analysis algorithm may be performed by central processing unit 146, following transmission by image sensors 120 and 125 of the captured images and receipt thereof by the central processing unit 146. In another implementation, the application of a given image analysis algorithm may be performed by image sensors 120 and/or 125, and subsequent operations (as hereinafter described) may be performed by central processing unit 146.

The application of image analysis algorithms, generally involves the identification of one or more images of objects, notably human form objects or barcode objects, as hereinafter explained, within images of work space 155 captured by image sensors 120 and 125. In general, this can be accomplished by object image analysis algorithms, such as supervised learning algorithms, that are designed and trained using templates with characteristics of human form features, for example, a human body shape, or a part thereof, for example, a face or a hand, to identify one or more human form objects within an image, or in the case of barcode objects, using templates with characteristics of barcode features. Object image analysis algorithms that may be used herein may be based on the initial extraction of a set of features from input images, for example, shape features (for example, based on histogram of oriented gradients (HOG) (Dalal N. and B. Triggs. International Conference on Computer Vision & Pattern Recognition (CVPR '05), June 2005, San Diego, United States. pp. 886-893)) or scale-invariant feature transform (SIFT) (D. G. Lowe., 1999, In: Computer vision, The proceedings of the seventh IEEE international conference on, volume 2, pp. 1150-1157)), appearance features (for example, based on Haar features (Papageorgiou, C. P. et al. In Computer vision, 1998, sixth international conference on, pp. 555-562. IEEE, 1998)), or motion features (for example, based on histogram of flows (HOF) (Dalal, N. et al., 2006, Human Detection Using Oriented Histograms of Flow and Appearance. In: Leonardis A., Bischof H., Pinz A (eds) Computer Vision ECCV 2006. ECCV 2006. Lecture Notes in Computer Science, vol 3952. Springer, Berlin, Heidelberg)), or a combination of these features. Then classifiers (e.g. Viola, P. and M. Jones, 2001, Second International Workshop on Statistical and Computational Theories of Vision-Modeling, Learning, Computing and Sampling; Lienhart, R. and J. Maydt, Image Processing, 2002, Proceedings, International Conference on v. 1, pp. 1-900-1-903) or localizers (e.g. Blaschko, M. B. and C. H. Lampert, 2008, In: Computer Vision-ECCV, 2-15, Springer) are used to identify objects, typically by running these classifiers or localizers over an image or region of an image. Examples and further guidance with respect to human form object image analysis algorithms to identify human form objects can be found for example in Gavrila, D. M., 1999, Computer Vision and Image Understanding, 82-98; Wang, L. et al., 2003, Pattern Recognition, 36 285-601, U.S. Pat. Nos. 9,256,781; 8,938,124; and 7,324,693.

Figure 3:
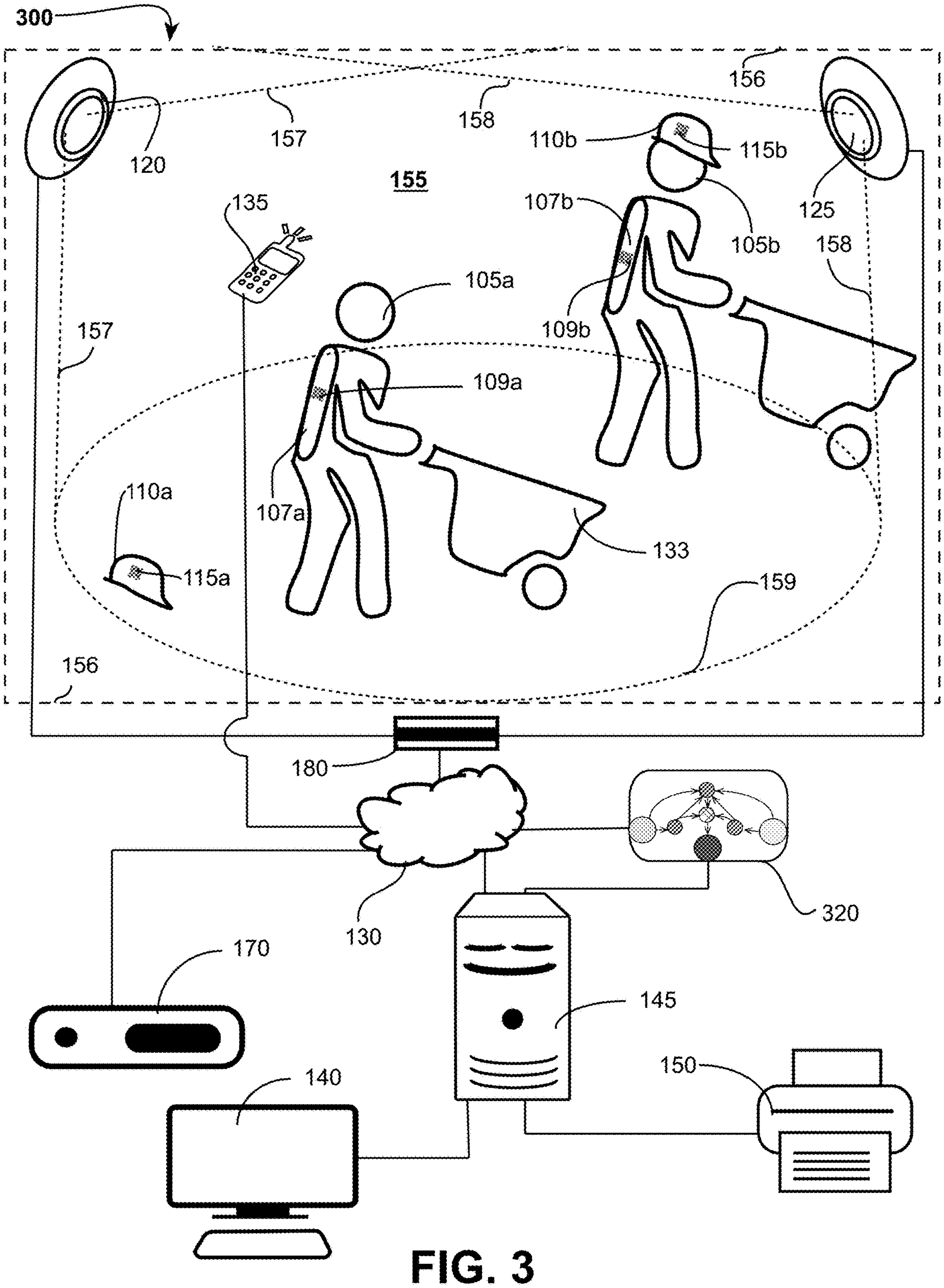
FIG. 3 is a schematic view of another system for monitoring the use of personal protective equipment according to an alternative example implementation of the present disclosure.

Referring next to FIG. 3, in some implementations, a system 300 can be implemented to include computational neural network 320, i.e. a computational model that performs calculations by applying one or more functions or approximations thereof to one or more inputs. Computational neural network 320 can be designed to classify input data obtained from captured images that are provided by first or second image sensor (120, 125), or by a database comprising recorded image data (as hereinafter described) to refine the ability of system 300 to correctly identify human form objects and barcode objects in captured images of work space 155 (as hereinafter described). In this sense, the computational neural network 320 acts as an image analysis algorithm that can detect both human form objects and barcode objects. Thus, using images from first or second image sensor (120, 125), computational neural network 320 can, for example, be configured to develop refinements in the proper identification/detection of human form objects (105*a*, 105*b*) within the acquired images, and address, for example, complexities such as variability in body poses, variability in physiques, occlusion of body parts, either by other body parts, or by non-human form objects, or by body parts of other human form objects. Furthermore, using images from first or second image sensors (120, 125), computational neural network 320 can, for example, be configured to develop refinements in the identification of barcodes (115*a*, 115*b*), and address, for example, complexities such as image distortions resulting from a barcode being recorded from various angled perspectives, partial occlusion of a barcode, for example, by an object or body part, or curving or warping of a barcode. One or both of these refinements can be implemented by periodically or continually training the neural network 320 to improve its performance and reduce the occurrence of errors in incorrect detections of human form objects in the captured images and the detections of corresponding barcodes.

In general, computational neural network 320 can be configured to include a plurality of neurons or nodes configured to calculate an output based on a weight assigned to an input, and can be arranged in layers, for example an input layer, an output layer and at least one hidden layer. The input data to computational network 320 can be provided by the first or second sensors (120, 125) or by a database comprising image data that is recorded by recording device 170 and stored in the data store as recorded images. The output of computational network 320 can be provided to central controller 145. At least one hidden layer of computational network 320 can operate to perform a classification function, for example, comparing a novel identified putative human form pose in an image to a series of images of human form objects in order to correctly classify human form objects in the series of images. Accordingly, the output may include any detected human form objects and/or barcode objects in the image data. These objects can be represented with coordinates in the image that is processed by the computation network 320 and represent the boundaries of these objects in the image. Examples of suitable neural networks that may be used include You Only Look Once (YOLO) (Redmon, J. et al., 2016, Proceeding of the IEEE Conference on Computer Vision and Pattern recognition, pp. 779-788), and neural networks based on Region-based Convolutional Neural Networks (R-CNN) (Girshick R. et al., 2014, IEEE Conference on Computer Vision and Pattern recognition, pp. 580-587), faster R-CNN (Ren, S. et al., 2017, IEEE Transactions on Pattern Analysis and Machine Intelligence 39 (6), pp. 1137-1349 (code at: https://github.com/ShaogingRen/faster_ronn; and https://github.com/rbgirshick/py-faster-rcnn), or Mask R-CNN (He K. et al. 2017 IEEE Conference on Computer Vision and Pattern recognition, pp. 2980-2988 (code at: https://github.com/facebookresearch/detectron2).

Figure 6A:
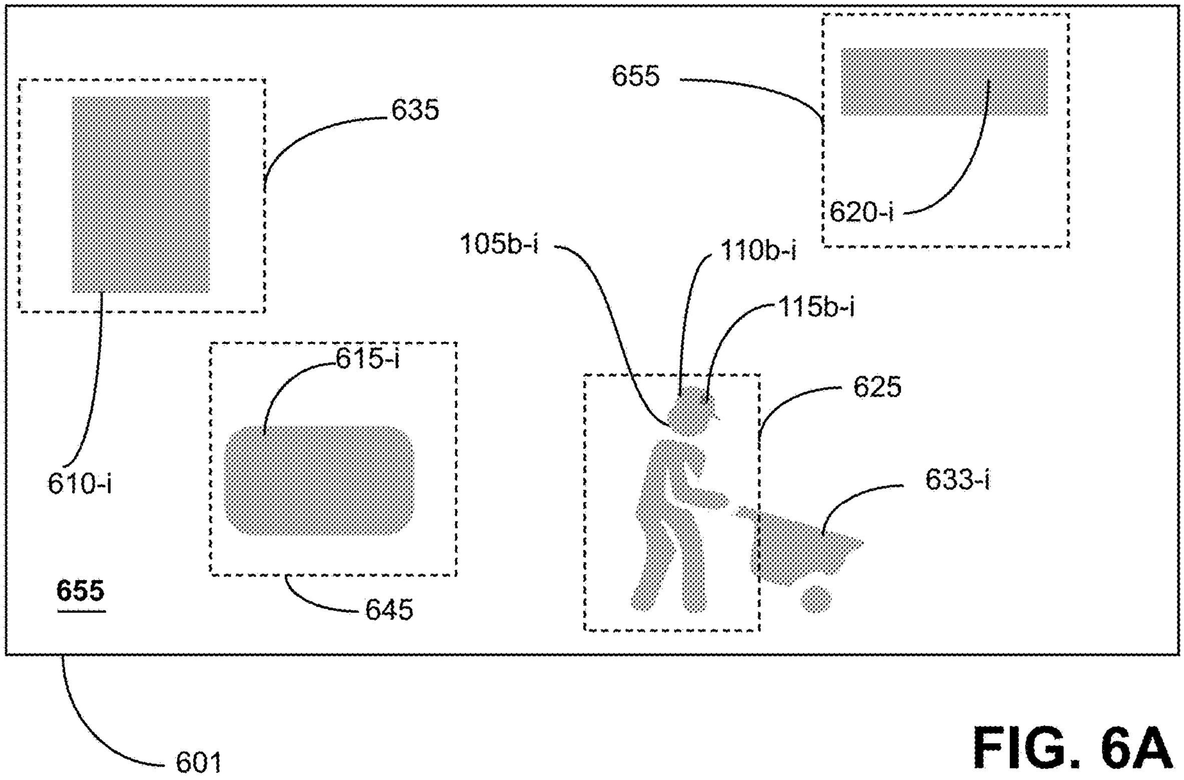
FIG. 6A is an example illustration of an image of a work space.
Figure 6B:
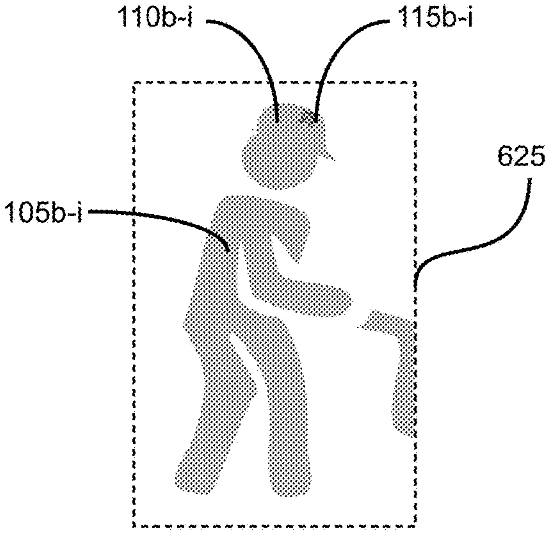
FIG. 6B is an example illustration of another image of a work space, representing a portion of the image in FIG. 6A.

Referring next to FIGS. 6A and 6B, shown therein is an example image 601 of work space 655. Image 601 is an image captured by, for example, image sensor 120. Visible within image 601 are human form object 105*b-i* (corresponding with an actual worker, see: e.g. worker 105*a* in FIG. 1), wearing safety helmet object 110*b-i* (corresponding with an actual safety helmet, see: e.g. safety helmet 110 in FIG. 1) and barcode object 115*b-i* (corresponding with an actual barcode, see: e.g. barcode 115 in FIG. 1). Further visible in FIG. 6A are various non-human form objects 610-*i*, 615-*i*, 633-*i* and 620-*i* (corresponding with various actual non-human form objects, see: e.g. wheelbarrow 133 in FIG. 1). In this example, first image sensor 120 together with central processing unit 146 is configured to perform a human form object image analysis algorithm, as explained above, of image 601 allowing for the identification of human form object 105*b-i* within image 601 of work space 655, while, at the same time, not identifying non-homo morphic objects 610-*i*, 615-*i* 620-*i* and 633-*i*, as human form objects.

In an aspect, the first and second image sensors 120 and 125 are configured together with the central processing unit 146 to select a second plurality of images from the first plurality of images, in which each of the images constituting the second plurality of images include at least one detected human form object. Thus, the first and second image sensors 120 and 125 are configured together with central processing unit 146 to perform a human form object image analysis algorithm using a first plurality of captured images captured by both image sensors (120, 125) such as example image 601 captured by a single sensor, e.g. image sensor 120. Some of these images may include one or more human form objects, and others may not. For example, if at the specific point in time an image is captured and no workers are present within the field of view 157, no human form objects are detected. The first and second image sensors 120 and 125 are configured together with the central processing unit 146 to select a second plurality of images from the first plurality of images, the second plurality of images having at least one detected human form object.

In another aspect, the first and second image sensors 120 and 125 are configured together with the central processing unit 146 to analyze the second plurality of images by applying to the images within the second plurality of images an object image analysis algorithm, which may be a barcode image analysis algorithm or the computational neural network 320 to detect a plurality of barcode objects, i.e. a barcode object image analysis algorithm. In general, this can be accomplished by object detection image algorithms, such as supervised learning algorithms, designed and trained using templates with characteristics of barcodes, or a part thereof. Thus, for example, first image sensor 120 together with central processing unit 146 is configured to perform image analysis on image 601 allowing for the identification of barcode object 115*b-i* within image 601 of work space 655. Algorithms and software that may be used in this regard include, for example, Zbar (http://zbar.sourceforge.net/); ZXing (https://github.com/zxing/zxing); Quirc (https://github.com/dlbeer/quirc); and BoofCV (https://boofcv.org/index.php?title =Performance:QrCode)

It is noted that, in general, identifying a barcode, and even more so a specific unique barcode, within an overall image, wherein the barcode represents a relatively small portion of the overall image, such as shown in image 601, can be difficult using known algorithms for image analysis, which may result in various image analysis errors including: other objects being misidentified as barcodes, barcodes not being identified despite their presence in an image, or identified barcodes that cannot be linked to a known issued barcode. However, by increasing the relative size of the barcode in the image, as shown in image 625, e.g. by cropping the initial image 601 or magnifying a portion of the image 601 to generate image 625, this error rate can be significantly reduced.

Thus, in some implementations, first and second image sensors 120 and 125 together with central processing unit 146 may be configured to perform a barcode object image analysis algorithm on a selected region of an image, notably a region selected in the proximity of a detected human form object, in order to detect barcode objects. Thus, referring to FIG. 6B, shown therein is example image region 625, which represents a portion of image 601. Image region 625 is selected for application of a 2D barcode object image analysis algorithm. This may be achieved by applying a framing or bounding algorithm, such as, for example, described in U.S. Pat. Nos. 9,256,781; 8,938,124; and 7,324,693, to a detected human form object. The framing or bounding algorithm is capable of creating image boundaries in a region of the image in such a fashion that the bounded region contains the human form object. Thus, for example, image boundaries can be created in a region of an image to encompass a single entire human form object so that there is no contact between the human form object and the image boundaries. The image boundaries can correspond, for example, with a distance of from about 0.5 meter to about 3 meters away from the actual worker that corresponds with the human form object. In one implementation, the image boundaries can correspond with a distance of from about 1 meter to about 2 meters away from the human form object in the image region. By contrast, image regions 635, 645 and 655, including images of non-human form objects 610*i*, 615*i* and 620*i*, respectively, are not selected for application to a framing algorithm and subsequent application of a barcode image analysis algorithm because image regions 635, 645 and 655 are not classified as containing a detected human form object. Within image region 625 a human form object 105*b-i* is detected (corresponding with an actual worker, see: e.g. worker 105*a* in FIG. 1). After detection of the human form object 105*b-i*, first and second image sensors 120 and 125 together with central processing unit 146 are configured to then perform a barcode object image analysis algorithm of image region 625 allowing for the identification of barcode object 115*b-i* within image region 625.

Furthermore, upon identification of a barcode object image, a barcode reading algorithm may be applied to the barcode object image, and the barcode is read, as hereinafter explained.

Accordingly, in at least one implementation, the application of the framing algorithm results in an image region being framed wherein the framed image region is sufficiently large to encompass therein a single entire human form object, and the image boundaries of the framed image region are formed so that there is no contact between the human form object and the image boundaries, as shown in FIG. 6B, FIGS. 7A-7F, and FIGS. 8A-8F.

In at least one implementation, the image boundaries can correspond with a distance of from about 0.5 meter to about 3 meters away, or about 1 meter to about 2 meters away from human form objects 105*a-i*, 105*b-i* that correspond with the actual workers 105*a* or 105*b*.

Figure 7A:
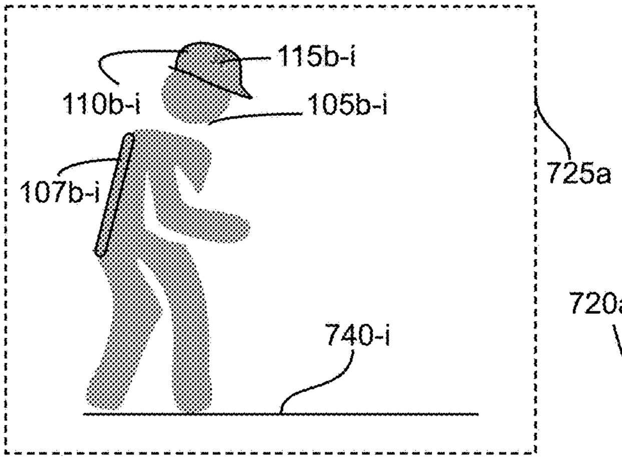
FIGS. 7A, 7B, 7C, 7D, 7E, and 7F are example illustrations of a plurality of temporally successive images of an area in a work space where the images shown in FIGS. 7A, 7C and 7E are captured by a first sensor and corresponding images shown in FIGS. 7B, 7D and 7F are captured at approximately the same time by a second sensor, according to an example implementation of the present disclosure.
Figure 7B:
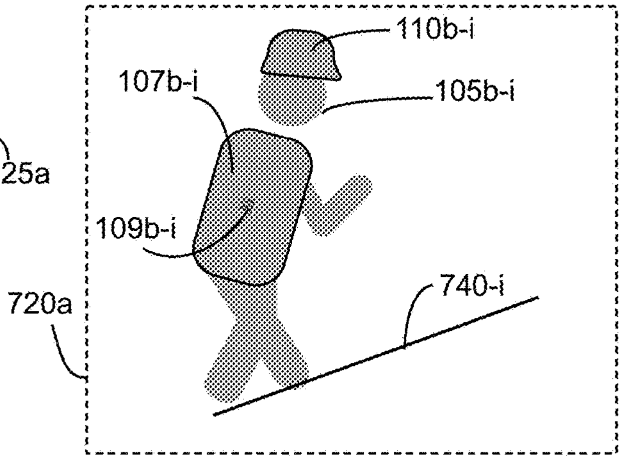
Figure 7C:
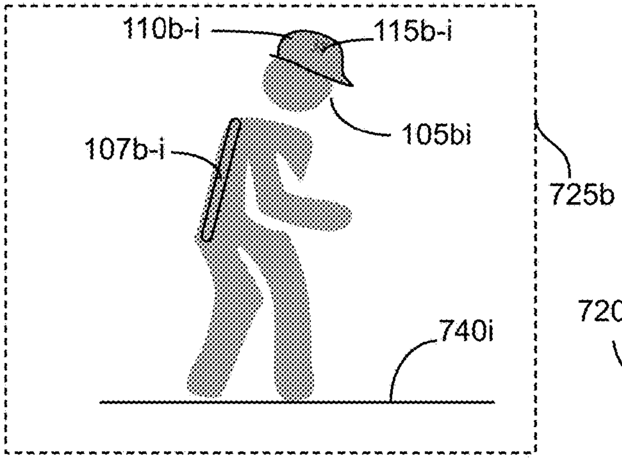
Figure 7D:
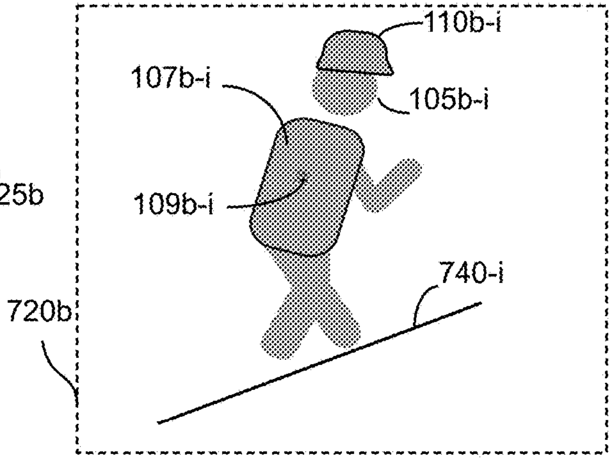
Figure 7E:
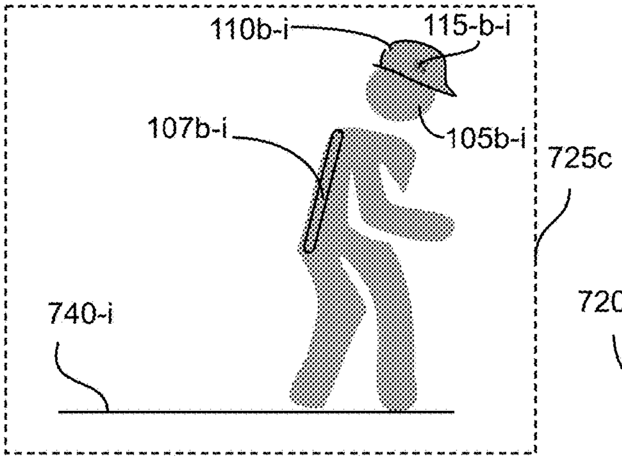
Figure 7F:
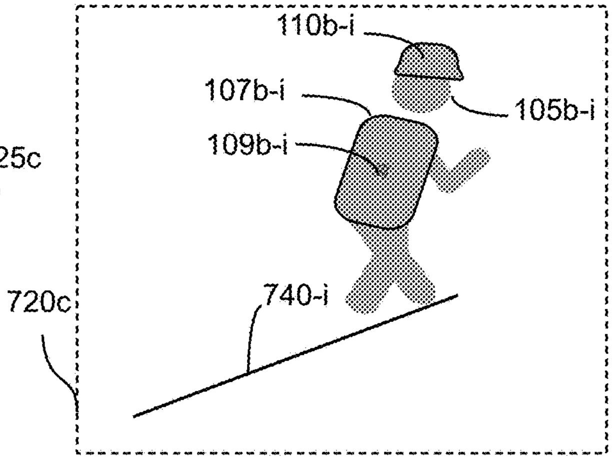
Figure 8A:
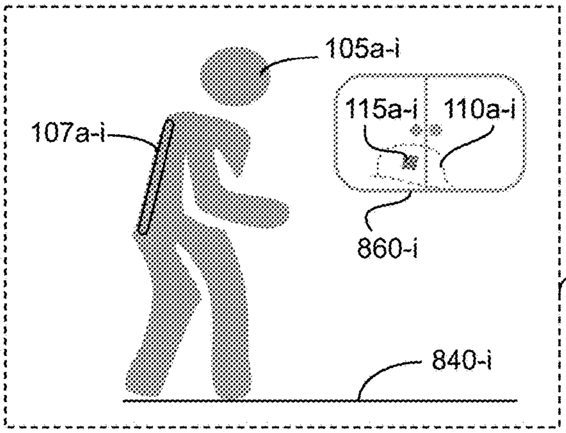
FIGS. 8A, 8B, 8C, 8D, 8E, and 8F are example illustrations of another plurality of temporally successive images of an area in a work space where the images shown in FIGS. 8A, 8C and 8E are captured by a first sensor and the corresponding images shown in FIGS. 8B, 8D and 8F are captured at approximately the same time by a second sensor, according to an example implementation of the present disclosure.
Figure 8B:
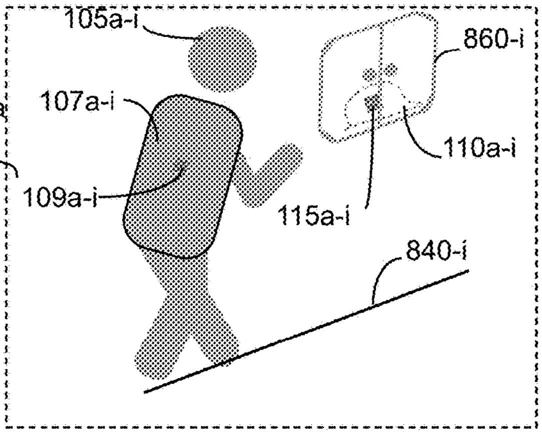
Figure 8C:
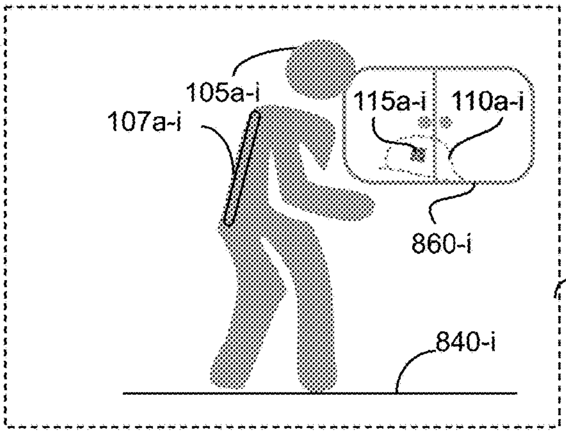
Figure 8D:
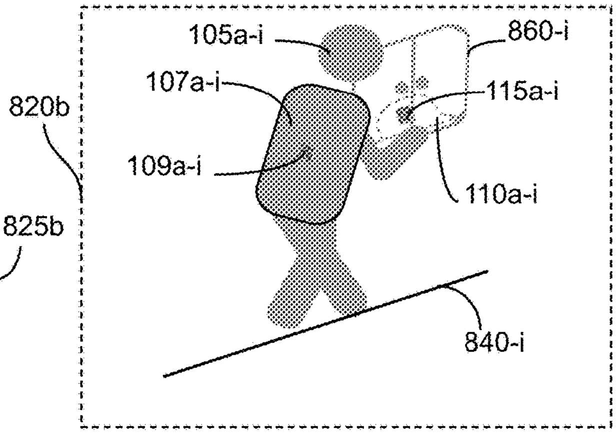
Figure 8E:
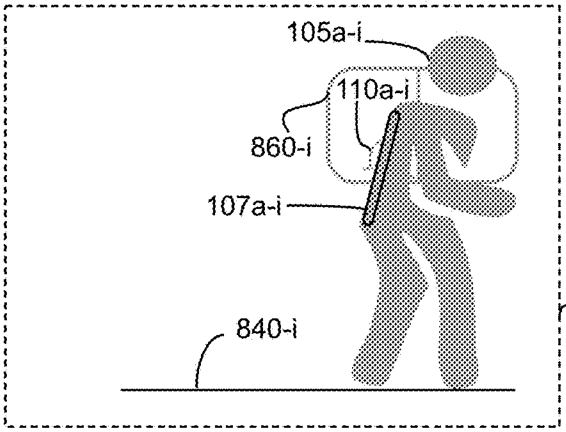
Figure 8F:
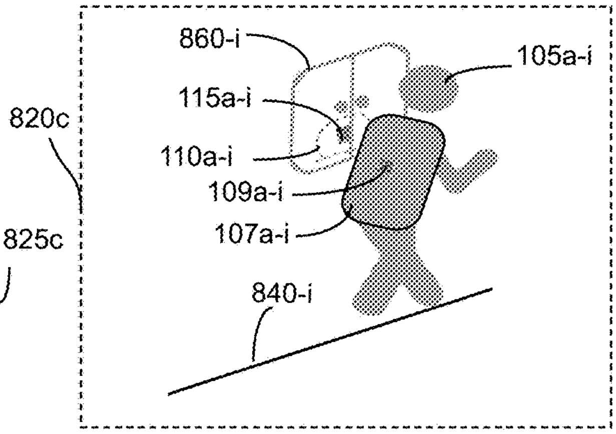

Next, referring to FIGS. 7A-7F and 8A-8F, shown in FIGS. 7A-7F are example illustrations of a series of temporally successive image regions of human form object 105*b-i*, and shown in FIGS. 8A-8F are example illustrations of a series of temporally successive image regions of human form object 105*a-i*. The successive image regions are determined while human form objects 105*a-i* and 105*b-i* are in the process of moving in a forward direction along line 840-*i* and 740-*i*, respectively. For example, FIG. 7A represents a temporally earlier determined image region including human form object 105*b-i* than the later determined image region of the human form object 105*b-i* shown in FIG. 7C. Human form object 105*b-i* is contained within image regions 720*a*, 720*b*, and 720*c*, of a plurality of images (not shown) comprising human form objects captured by first image sensor 120, and in image regions 725*a*, 725*b*, and 725*c*, of a plurality of images (not shown) comprising human form objects captured by second image sensor 125. Similarly, referring to FIGS. 8A-8F, human form object 105*a-i* is contained within image regions 820*a*, 820*b*, and 820*c* of a plurality of images (not shown) comprising human form objects captured by first sensor 120, and in image regions 825*a*, 825*b*, and 825*c*, of a plurality of images (not shown) comprising human form objects captured by second sensor 125.

Image sensors 120 and 125 are installed so that each image sensor 120 and 125 can capture images from a different angle relative to one another so that barcodes and/or PPE are captured in images from at least one of the image sensors 120 and 125. In this respect, it is noted that image regions 725*a*, 725*b*, and 725*c* each contain barcode 115*b-i*, on safety helmet 110*b-i*, as captured by sensor 125. The same bar code 115*b-i*, however, is not captured by sensor 120, due to its different angle of view. Barcode 115*a-i*, however, is not captured in image regions 825*a*, 825*b*, and 825*c* since safety helmet 110*a-i* has been placed inside cupboard 860-*i*. The same barcode 115*a-i* is also not captured by sensor 120, for the same reason, since safety helmet 110*a-i* has been placed inside cupboard 860-*i*.

It is further noted that image regions 720*a*, 720*b*, and 720*c*; and 820*a*, 820*b*, and 820*c* each contain barcodes 109*a-i* and 109*b-i*, respectively, on safety vests 107*a-i*, and 107*b-i*, respectively, as captured by image sensor 120. The same bar codes 835*a-i* and 735*b-i*, however, are not captured by image sensor 125 due to the different sensor angle.

System 100 is further configured to determine on a probabilistic basis if worker 105*b* is wearing safety helmet 110*b* and safety vest 107*b* and if worker 105*a* is wearing safety helmet 110*a* and safety vest 107*a*, in accordance with the safety rules, by using a probabilistic algorithm, as further explained first with reference to FIGS. 7A-7F, and thereafter with reference to FIGS. 8A-8F.

Thus, referring again to FIGS. 7A-7F, image regions 720*a*, 720*b* and 720*c* are image regions are from images that are captured by image sensor 120. Image regions 725*a*, 725*b* and 725*c* are image regions from images that are captured by image sensor 125. In each of image regions 720*a*, 720*b*, 720*c*, 725*a*, 725*b*, and 725*c*, human form object 105*b-i* is detected using an image analysis algorithm that is adapted to detect human form objects (i.e. a human form object image analysis algorithm or a computational neural network capable of classifying human form objects). Furthermore, in each of image regions 725*a*, 725*b* and 725*c*, barcode object 115*b-i* is detected using an image analysis algorithm that is adapted to detect barcode objects (i.e. a barcode object image analysis algorithm or a computational neural network capable of classifying barcode objects). Central processing unit 146 together with first and second image sensors 120 and 125 are configured so that upon having detected a barcode object, for example, barcode object 115*b-i* in one of the image regions (e.g. in image region 725*a*), the barcode corresponding with the barcode object is read using a barcode reading algorithm, and the worker to whom the corresponding barcode 115*b* has been assigned, namely, worker 105*b* is identified. Barcode reading algorithms and software that may be used in this regard include, for example: Zbar (http://zbar.sourceforge.net/); ZXing (https://github.com/zxing/zxing); Quirc (https://github.com/dlbeer/quirc); and BoofCV (https://boofcv.org/index.php?title=Performance:QrCode)

This identification can take place automatically since system 100 includes a database in which the personal information for each worker is cross-referenced (i.e. linked) with all barcodes that are related to PPE that is used by each worker, in such a fashion that if the database is searched using a barcode, the personal information corresponding to the barcode, can be identified as hereinbefore explained.

Furthermore, central processing unit 146 together with first and second image sensors 120 and 125 are configured so that other barcodes assigned to worker 105*b* can be located, including barcode 109*b* associated with safety vest 107*b*. This identification can take place automatically since system 100 includes a database which stores personal information for each worker and all barcodes that are related to the personal information of each worker, in such a fashion that if the database is searched using a barcode (also known as a searched barcode), the personal information corresponding to the searched barcode and all other barcodes associated with the same personal information can be identified in the database. Central processing unit 146 together with first and second image sensors 120 and 125 are further configured to evaluate each of the image regions 720*a*, 720*b*, 720*c*, 725*a*, 725*b*, and 725*c* for the presence of additional barcode objects 115*b-i* and 109*b-i* corresponding with the identified barcode objects 115*b* and 109*b*, and to apply a probabilistic algorithm based on the prevalence of each of the barcodes 115*b* and 109*b* corresponding with the additional barcode objects 115*b-i* and 109*b-i* in image regions 720*a*, 720*b* 720*c*, 725*a*, 725*b*, and 725*c*. The probabilistic algorithm further uses a predetermined probability threshold value, which may be varied in different implementations, to determine whether each of the barcodes 115*b* and 109*b* corresponding with barcode objects 115*b-i* and 109*b-i* have actually been correctly detected in the image regions 720*a*-720*c* and 725*a*-725*c*. Thus, for example, the predetermined probability threshold value may be set so that the prevalence (proportion of the number of barcode objects for each barcode in all image regions) is at least 33%. Thus, each of the barcodes assigned to worker 105*b* must be identified in at least 33% of the image regions 720*a*, 720*b* 720*c*, 725*a*, 725*b*, and 725*c* to ensure that the detected barcodes are not false positives and to also take into account the fact that images that are captured from different angles may not include these barcodes in all image regions. For example, barcode objects 115*b-i* corresponding with searched barcode 115*b* is present in 3 out of 6 image regions, namely image regions 725*a*, 725*b*, and 725*c*. As another example, barcode objects 109*b-i* corresponding with searched barcode 109*b* is present in 3 out of 6 image regions, namely image regions 720*a*, 720*b*, and 720*c*. The probability value thus is 50%, which is higher than the predetermined probability threshold value of 33%. Thus, central processing unit 146 together with first and second image sensors 120 and 125 are configured to determine that it is probable that worker 105*b* is wearing safety vest 107*b* and safety helmet 110*b* since it was determined that each of the barcode objects 109*b* and 115*b* are in a percentage of the images having a human form object corresponding to worker 105*b* that is larger than the predefined probability threshold value.

Thus, for example, referring again to FIGS. 8A-8F, image regions 820*a*, 820*b* and 820*c* are image regions from images detected by image sensor 120 while image regions 825*a*, 825 and 825*c* are image regions from images detected by image sensor 125. In each of image regions 820*a*, 820*b*, 820*c*, 825*a*, 825*b*, and 825*c*, human form object 105*a-i* is detected. Furthermore, in none of image regions 820*a*, 820*b*, 820*c*, 825*a*, 825*b*, and 825*c* is barcode object 115*a-i* detected, since safety helmet 110*a-i* has been placed in a cupboard corresponding with (non-human form) image object 860-*i*. Central processing unit 146 together with first and second image sensors 120 and 125 are configured so that upon having detected a barcode object, for example, barcode object 109-*i* in just one of the image regions (e.g. in image region 820*a*), the barcode corresponding with barcode object 109-*i* is read, and the worker to whom the corresponding barcode 109*b* has been assigned, namely, worker 105*a* is identified by cross-referencing the worker's personal information with the barcode 109*b* in the database. Furthermore, central processing unit 146 together with first and second image sensors 120 and 125 are configured so that additional barcodes assigned to worker 105*a* are searched for in the database, which in this example includes barcode 115*a* associated with safety helmet 110*a*. This identification can take place automatically since system 100 includes a database in which the personal information for a given worker and all barcodes associated with PPE worn by that worker are cross-referenced to each other in the database, in such a fashion that if the database is searched using a single barcode, the personal information corresponding to that barcode and the additional barcodes with the same personal information can be identified in the database. Central processing unit 146 together with first and second image sensors 120 and 125 are further configured to evaluate each of the image regions 820*a*, 820*b*, 820*c*, 825*a*, 825*b*, and 825*c* for the presence of barcode objects 115*a-i* and 109*a-i* corresponding with the identified additional barcodes 115*a* and 109*a*, and to apply a probabilistic algorithm based on the prevalence of the barcode objects 115*a* and 109*a* corresponding with barcode objects 115*a-i* and 109*a-i* that are detected in image regions 820*a*, 820*b* 820*c*, 825*a*, 825*b*, and 825*c*. The probabilistic algorithm further includes a predetermined probability threshold value, which may be varied in different implementations. Thus, for example, the predetermined probability threshold value may be set so that the prevalence (proportion of the number of barcode objects for each barcode in all image regions) is as at least 33%. Thus, each of the barcodes assigned to worker 105*a* must be identified in at least 33% of the image regions 820*a*, 820*b* 820*c*, 825*a*, 825*b*, and 825*c*. Barcode objects 109*a-i* corresponding with searched barcodes 109*b* is present in 3 image regions out of 6 image regions, namely image regions 820*a*, 820*b*, and 820*c*. However, barcode objects 115*a-i* corresponding with searched barcode 115*a* is present in none of the 6 image regions 820*a*, 820*b*, 820*c*, 825*a*, 825*b*, and 825*c*. The determined probability value thus is 50% with respect to barcode object 109*a-i*, which is associated with safety vest 107*a*, and the determined probability value is higher than the predetermined probability threshold value. The probability value thus is 0% with respect to barcode object 115*a-i*, which is associated with safety helmet 110*a*, and the determined probability value is lower than the predetermined probability threshold value. Thus, central processing unit 146 together with first and second image sensors 120 and 125 are configured to determine that it is probable that worker 105*a* is wearing safety vest 107*a* and it is probable that worker 105*a* is not wearing safety helmet 110*a*.

The foregoing represent examples based on image analysis of 6 image regions to detect two different barcodes. It will be clear that the number of image regions may be varied, as may be the number of barcodes as this depends on the number of PPE items that the worker should be wearing in the work space. In general the larger the number of image regions that is analyzed, the more accurate the results will be, notably when there are changes in the positions of one or more objects in the images. At the same time, analysis of a larger number of image regions requires more computing capability within central controller 145 and/or image sensors 120 and 125. The number of image regions that can be analyzed can be varied. In some implementations, the number of image regions can be predefined to be from at least 10 images captured by each image sensor 120 and 125. Furthermore, the period of time during which the images are captured may range, for example, from about 5 seconds to about 60 seconds, as controlled by a timer which may be included in system 100 (not shown). Thus, separation for a certain amount of time between a user and a personal protective equipment item (for example, 10 seconds) and/or a physical separation between a user and the personal protective equipment across a relative short distance (for example, 1 m), may be detected. For example, if the images shown in FIGS. 8A-8F correspond with an 8 second time period, even if safety helmet 110*a* had been placed inside the cupboard (corresponding with 860-*i*) by worker 105*a* the second prior to capture of the images shown in FIGS. 8A-8B and then put back on his or her head the second after the images shown in FIGS. 8F-8G were captured, the separation is detected by system 100. Similarly if, the image region in FIGS. 8A-8F corresponds with a distance of from about 0.5 meter away from the detected human form object in the image region, and if safety helmet 110*a* was placed a meter away from worker 105*a*, outside the image region (instead of in the cupboard), the separation is detected by system 100.

Central processing unit 146 is further configured to execute a safety action associated when the computed probability value of a detected barcode object for a given personal protective equipment item is lower than the predetermined probability threshold value meaning that the worker does not have the given personal protective equipment item. Thus, for example, central controlling unit 146 can activate a signaling component, illustrated by, cell phone 135 by emitting an alert signal. In other implementations, the signaling component can be another electronic device capable of emitting an alert signal such as, for example, a tablet computer. The physical form of the alert signal can vary and can be, for example, but is not limited to, a light signal, a sound signal, or a vibrational signal, or a combination thereof, or any other detectable alert signal. In some implementations, alert signals of different intensities (i.e. louder sound signals or more intense vibration signals) can be emitted the longer the amount of time that the worker is without the given personal protective item. This amount of time can be determined based on the time interval over which images are captured are analyzed to probabilistically determine that the worker is without the given personal protective item. In general, the system can be configured so that when, based on the computed probability value, it is probable that a worker is not wearing a given personal protective equipment item in accordance with the safety rules applicable to a work space, central controller 145 can take a safety action.

Furthermore, in some implementations, output data is provided to an output device as part of the execution of a safety action. Thus, output data may be provided in the form of safety reports, incident reports, accident reports, and the like. The output data and database (not shown) can comprise information relating to the personal protection equipment, for example, the first and last use times and/or dates, information relating to individual users of the personal protection equipment, including, for example, the identity of the users and/or the location of the users, information relating to a work site, information relating to the barcodes used with the personal protective equipment, compliance observations, compliance history, safety violations and safety actions taken, and the output data can be provided in various formats including, for example, printed reports, photo format (e.g. JPEG, PNG, GIF), or video format (e.g. MPEG, AVI, MP4). The output data may be used for a wide range of purposes such as, for example, to develop strategies for improvement of safe behavior of workers who use the personal protective equipment, to prevent or limit incidents or accidents or injuries to workers in hazardous work environments, or to aid investigations of incidents or accidents.

Referring again to FIG. 3, in some implementations, a system according to the present disclosure can include an ancillary data processing unit. Thus, system 300 includes ancillary processing unit 180 configured to obtain ancillary data which can assist in algorithmic image analysis where the ancillary data include meta-data, from first and second image sensors 120 and 125. Meta-data can include, for example, sensor related information, for example, sensor identifiers (for example, a unique identifier associated with sensor 125 or sensor 120), sensor positioning information, for example the location and/or relative angles of image sensor 120 and 125, and time code information, such as the time at which an image is captured, and other meta-data. Such meta-data can be useful for processing, or for review of images by humans. Central controller 145 is configured to acquire, via network 130, ancillary data from ancillary processing unit 180.

It is noted that in some implementations additional sensors can be included. Thus, for example, in a given work space, 2, 3, 4, 5, 6, 7, 8, 9, 10 or more sensors configured to continuously or periodically detect human form objects and barcode objects. Notably in larger work spaces or more crowded work spaces an even larger plurality of sensors can be installed. Most preferably, a sufficient number of sensors are installed to monitor substantially an entire work space.

In some implementations, system 100 can further include recording device 170, for example a network video recorder (NVR) or a digital video recorder (DVR), for recording the image data, and the recording device 170 is coupled to a data storage device. The data storage device can be included in central controller 145, or it can be a separate data storage device, for example included in recording device 170. It is noted that in some implementations, the image data may be stored in lower resolution images compared to the images that are initially captured by the image sensors 120 and 125, for example in Joint Photographics Expert Group (JPEG) format, in order to limit the use of storage space. In this respect, central processing unit 146 may be configured to convert the images captured by sensors 120 and 125 into a lower resolution format, such as JPEG format, before the images are recorded by recording device 170. The stored image data can be made available for analysis via central controller 145, including for human evaluation, for example, to evaluate, correct, adjust, confirm or improve the performance of system 100, or for analysis by a computational neural network, as hereinafter further described.

Figure 4:
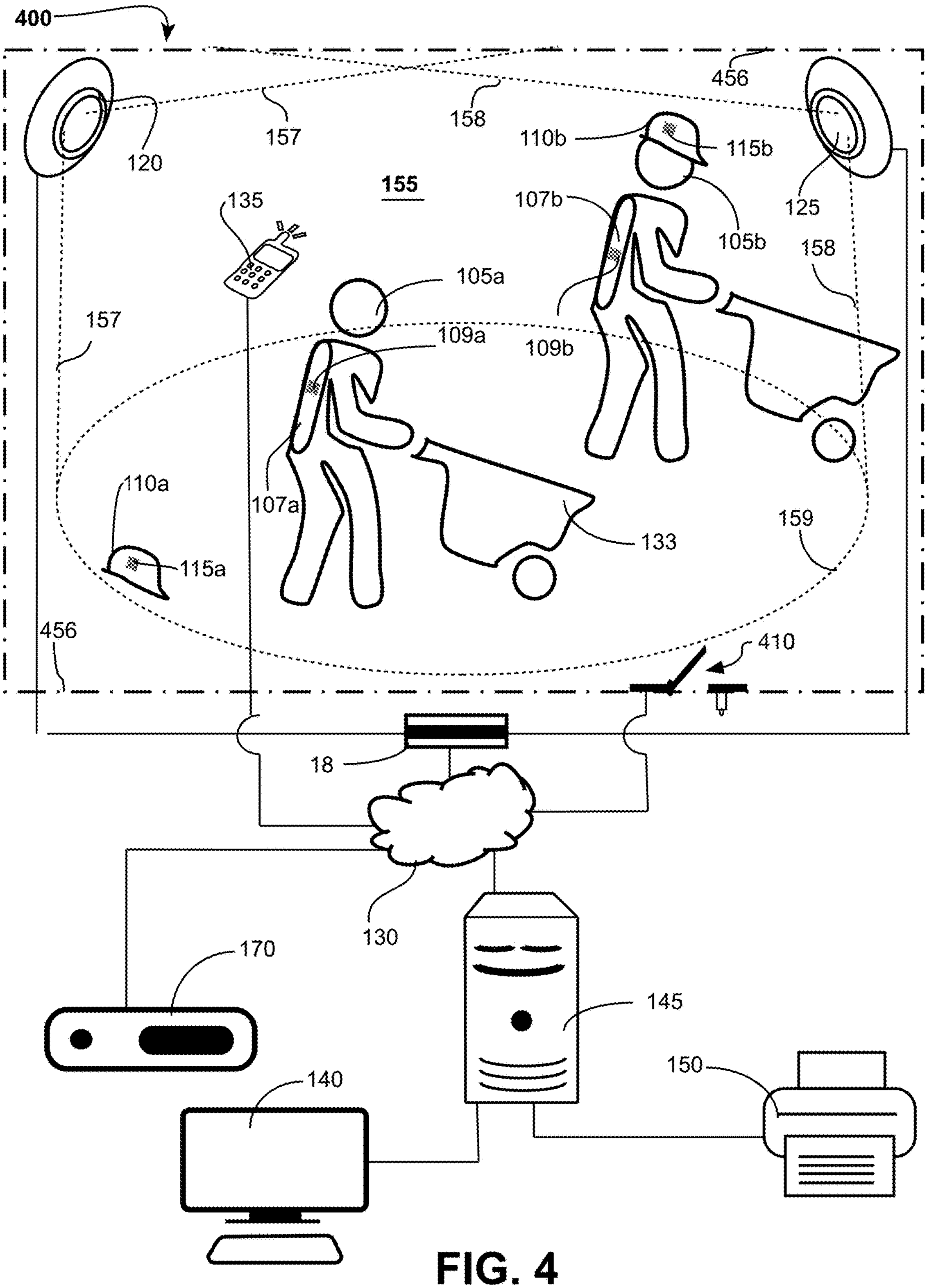
FIG. 4 is a schematic view of another system for monitoring the use of personal protective equipment according to an alternative example implementation of the present disclosure.
Figure 5A:
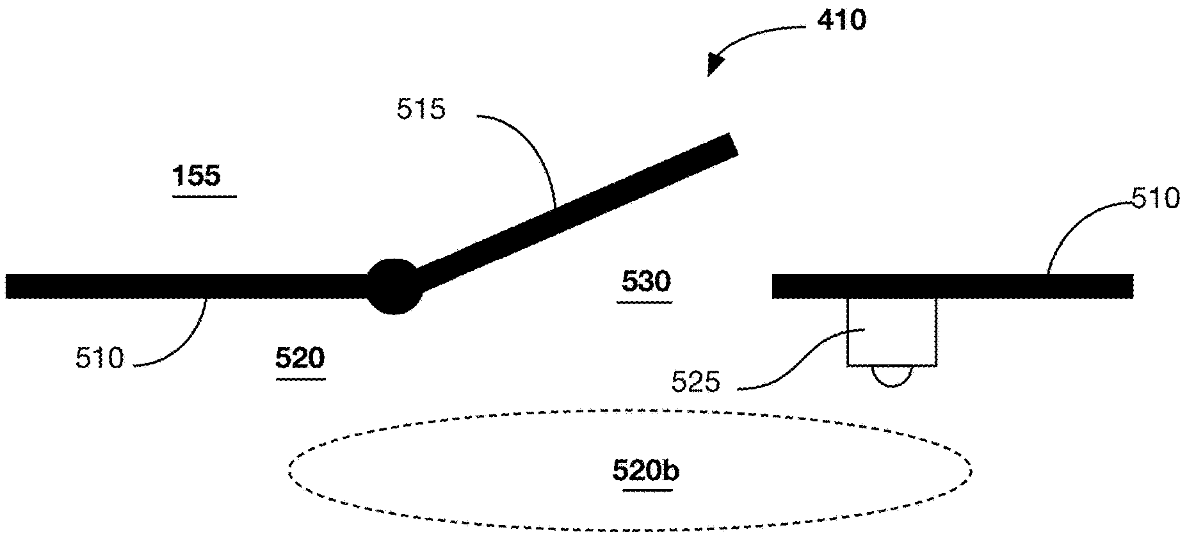
FIG. 5A is a schematic view of an electronic device for inclusion in an electronic access control system for monitoring the use of personal protective equipment according to an example implementation of the present disclosure.
Figure 5B:
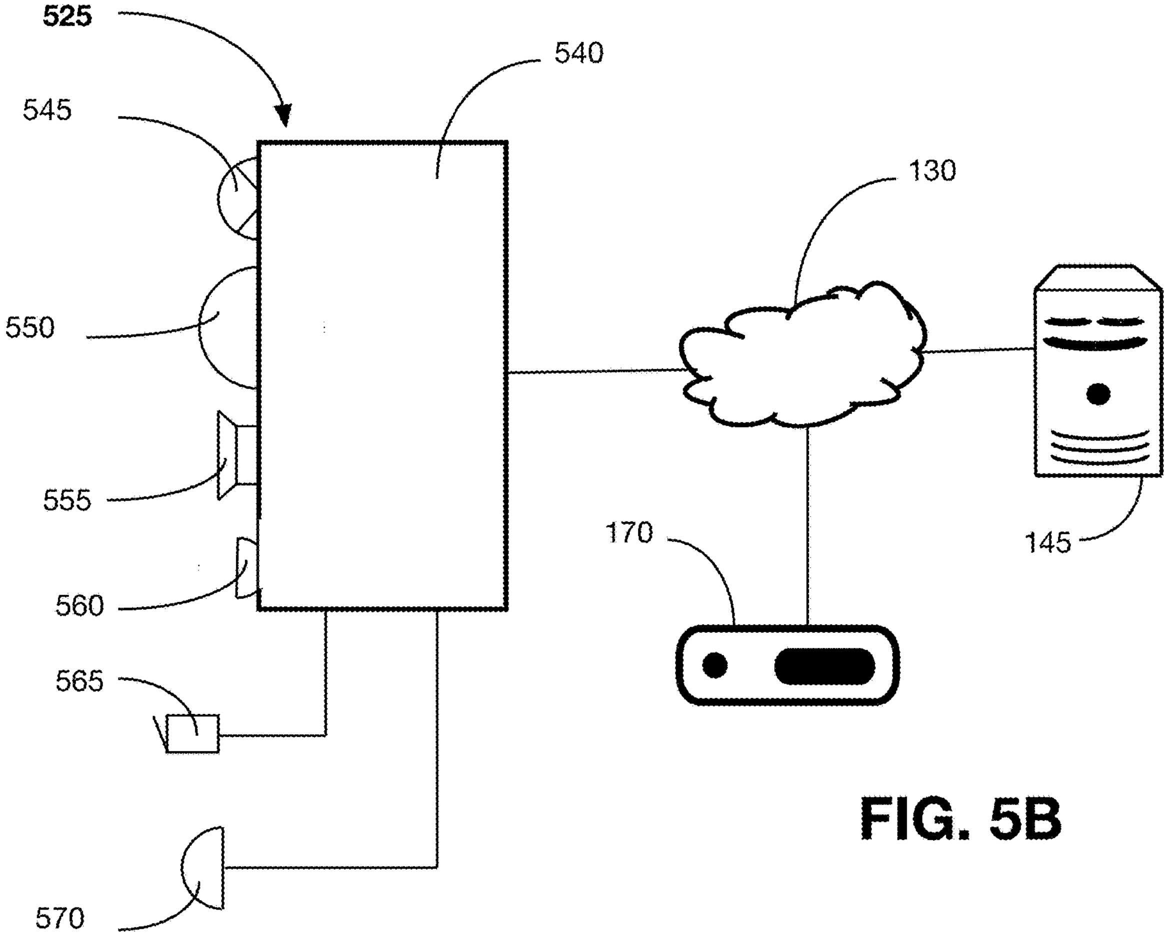
FIG. 5B is a schematic view of a gate control system for inclusion in an electronic access control system for monitoring the use of personal protective equipment according to an example implementation of the present disclosure.

Referring now to FIGS. 4, 5A and 5B, in some implementations, a system 400 can be configured to include an electronic access control system, i.e. a system that can control access, for example, by workers (105*a*, 105*b*) to work space 155. Thus, an electronic access control system 410 can be situated at the enclosing perimeter 456 defining work space 155, and separating work space 155 from exterior 520. Enclosing perimeter 456 can, for example, be a fence, or a wall or other barrier generally preventing entry by workers into work space 155. In this example, electronic access control system 410 includes openable gate 515 providing access to workers under certain conditions to work space 155 via entryway 530, and gate control system 525 including camera 550.

For example, in the implementation shown in FIGS. 5A-5B, worker access to work space 155 is controlled by two keys, a first barcode key, and a second biometric key.

Referring further to FIGS. 5A-5B, gate control system 525 is coupled to central control unit 145 via network 130. Gate control system 525 is further coupled to gate lock 565 and includes a processor (not shown) to control its operation and communicate with central controller 145. In order for a worker to open gate 515 and enter through entryway 530, in a first authentication step, the worker initially presents a barcode, for example a 2D barcode, to a lens of camera 550. This barcode may also be referred to as a security or identification barcode. The barcode may be presented in any form, for example in the form of a barcode printed on a card, an ID tag or on a screen, for example, a telephone screen. Gate control system 525 is configured so that upon being presented with a barcode, it communicates with central control unit 145 to retrieve previously stored biometric data, for example facial recognition biometric data, matching with the presented barcode is retrieved. In a second authentication step, gate control system 525 then records biometric data of the worker, captured via camera 550, when the worker is positioned in front of gate 515 in area 520*b* (which may be marked), and communicates with central control unit 145, which in turn attempts to match the recorded biometric data with the stored biometric data. When the stored and recorded biometric data match, gate lock 565 is released and the worker can pass through gate 515 and access work space 155 via entryway 530. Conversely, if the stored biometric data and recorded biometric data do not match, gate lock 565 remains locked, and access to work space 155 is denied. Thus, it will be clear that opening of gate 515 requires the presentation of a barcode and matching of biometric data in order for a worker to pass through openable gate 515.

Gate control system 525 further includes light 545 to facilitate recording of biometric data via camera 550. For example, the light 545 can be controlled to provide a desired level of illumination to make it easier for the camera 550 to acquire images of the barcode and obtain biometric data from the worker.

Gate control system 525 further includes audio speaker 555 and microphone 565. These may be used to provide a worker with instructions regarding his position relative to the lens of camera 550 to allow appropriate capture of biometric data from the worker, to allow the worker to communicate with support or security staff, to provide audio instructions to the worker and/or to record audio data.

Figure 5C:
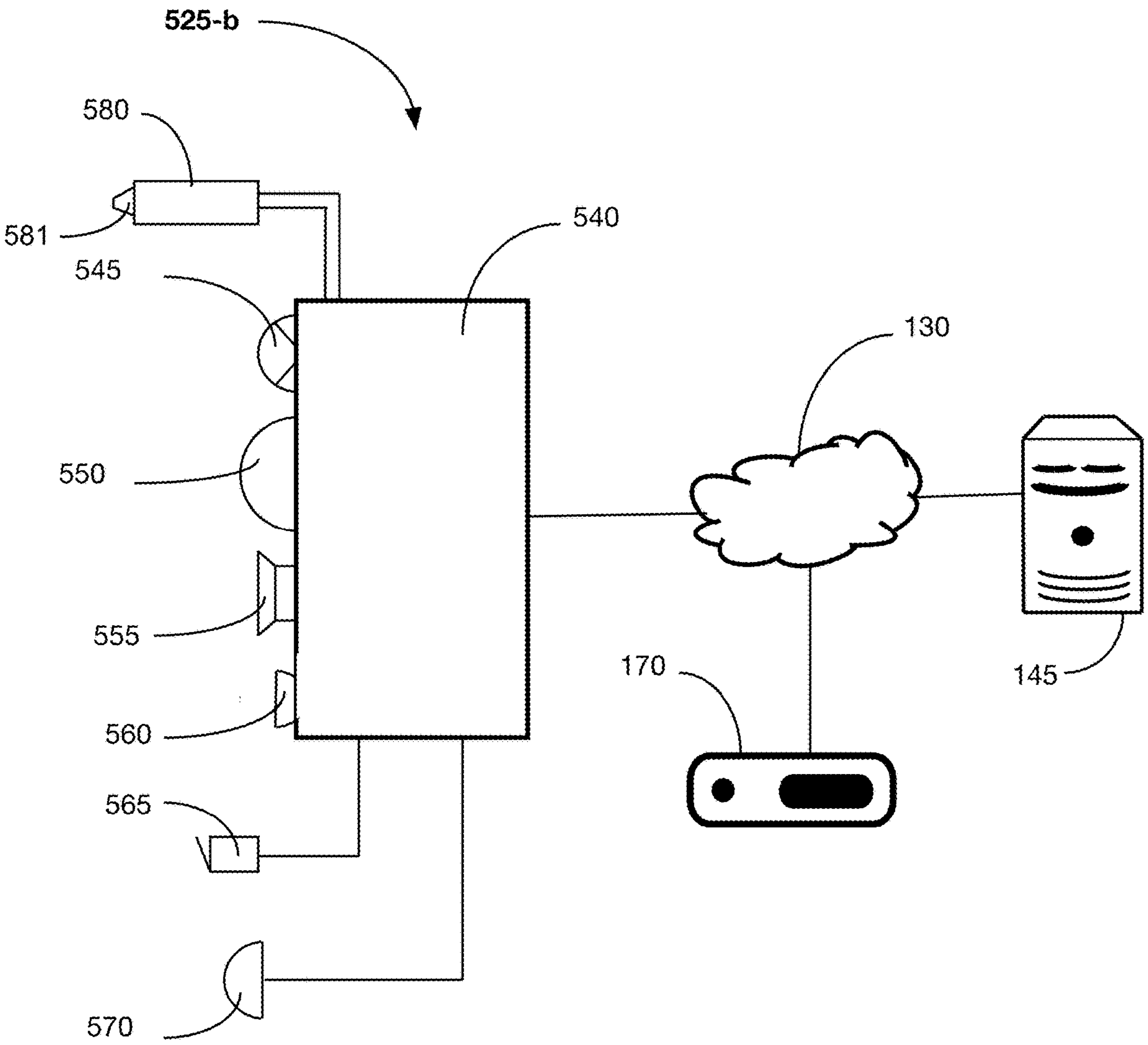
FIG. 5C is a schematic view of another gate control system for inclusion in an electronic access control system for monitoring the use of personal protective equipment according to an example implementation of the present disclosure.

Referring now to FIG. 5C. in an alternative implementation, a gate control system 525-*b*, including a processor (not shown) to control its operation and communicate with central controller 145, may be configured to include a temperature-detection device 580 coupled to central controller 145 Temperature-detection device 580 is installed and configured to detect the body temperature of a worker (not shown) situated within presentation space 520*b*. Temperature-detection device 580 may have a temperature sensor 581 that requires physical contact with the worker within presentation space 520*b*, for example, by physical contact between a finger of the worker and temperature sensor 581. Instructions to the worker to establish such contact may be provided by audio-speaker 555. More preferably, however, temperature-detection device 580 may be a temperature detection device including a temperature sensor 581 that permits remote temperature detection, i.e. a temperature sensor which does not require physical contact between the worker and temperature sensor 581, such as for example, an infrared temperature scanning device, which may operate at a distance of a few inches from the worker's forehead, or from other sensing zones of the worker.

Furthermore, in some implementations, temperature-detection device 580 may be situated and installed to be fixed in place to allow for temperature detection of worker situated within presentation space 520*b*, shown in FIG. 5C. In other implementations, a temperature-detection device 580 may be a portable device, including, a hand-held device, which may be operated by another person when the worker is situated within presentation space 520*b*.

The temperature-detection device 580 may include any temperature scanner, a body thermometer, or other device for reading the body temperature of a human being, including any temporal temperature scanner, i.e. a temperature scanner for detecting body temperature more or less continuously as a function of time. Temperature-detection devices that may be used in accordance herewith include the temperature-detection devices described in U.S. Pat. No. 8,282,274, for example.

In general terms, temperature-detection device 580 can be configured to detect the body temperature of a worker within presentation space 520*b*, and subsequently transmit the detected body temperature to central controller 145. Central controller 145 can be configured to transmit a signal to unlock electronic lock 565, thus allowing gate 515 to be opened and allowing the worker to access work space 155, when the worker's detected body temperature does not deviate from the body temperature of a healthy person, for example, when the worker's body temperature does not exceed an acceptable predefined body temperature range, such as a temperature range including temperatures 37° C., 37.5° C., 38° C., or 38.5° C. Conversely, when the worker's detected body temperature does deviate from the body temperature of a healthy person, and is, for example, in excess of 37° C., 37.5° C., 38° C. or 38.5° C., central controller 145 is configured to not transmit a signal to electronic lock 565 so that it may remain locked even if the worker has passed other security checks. In an alternate embodiment, no communication with central controller 145 is required and the processor of gate control system 525-*b* and gate control system 525-*b* may be configured to perform the temperature check, and control electronic lock 565. Thus, it is possible to limit access to work space 155 to workers who do not present with elevated body temperatures, for example, and only admit workers to work space 155 who present with a predefined body temperature range of about 36.5° C. to about 38.5° C., for example. Furthermore, central controller 145 can be configured so that a worker in presentation space 520*b* is notified of the detected body temperature via audio-speaker 555. In the event a worker is denied access to work space 155 as a result of a detected abnormality in body temperature, the worker may undergo further separate medical examination, as desired. Thus, this example implementation may be implemented to control the spread of contagious diseases which cause an increase in the body temperature of the worker so that their body temperature is not in the predefined body temperature range.

It is noted that in some implementations, temperature-detection device 580 can be configured to be operable in conditions in which substantial variations in ambient temperatures can occur, for example, due to changing or harsh weather conditions. In this respect, the temperature-detection device may be configured to correct for variations in ambient temperatures. For example, in the event a worker presents themselves for entry to a work space in cold winter temperatures, temperature-detection device 580, together with central controller 145, may be configured to correct the detected body temperature upwards. Similarly, if a worker presents in warm summer temperatures, temperature-detection device 580 together with central controller 145, may be configured to correct the detected body temperature downwards. The foregoing corrections are particularly desirable when the temperature-detection device measures/detects skin surface temperatures.

It is noted that central controller 145 may be configured so that the temperature-detection device 580 can detect the body temperature of a worker prior to the performance of the authentication step, or during the performance of the first and/or second authentication step, or following the performance of the second authentication step.

In some implementations, temperature-detection device 580 further may be an infrared sensor configured to detect a heat profile based on the thermal contours of a worker in presentation space 520*b*. In such implementations, the detected heat profile is sent to the central controller 145, which can be configured to transmit a signal to unlock electronic lock 565, thus allowing gate 515 to be opened and allowing the worker to access work space 155, only when the detected heat profile is consistent with certain characteristics or attributes of an actual worker in presentation space 520*b* who does not have an abnormal temperature. Thus, for example, central controller 145 can be configured so that if a worker attempts to circumvent authentication by presenting an inanimate object, which may be a picture of a face of a worker who has authorization to access the work space for example, during an authentication step requiring the presentation of the facial recognition biometric data of a worker, the detection of the heat profile of the inanimate object by the temperature-detection device 580 results in a detected heat profile which is inconsistent with the presence of an actual worker, which results in the central controller 145 not unlocking electronic lock 565.

It is noted that in some implementations, unlocking of gate 515 is not automatic, but instead is performed by another person, e.g. a security guard. Thus, upon presentation of a barcode by a worker to camera 550, a security guard, who may be located remotely, may be presented with a previously recorded facial image corresponding with the barcode. The security guard may be then required to confirm that the worker that is seen via camera 550 corresponds with the previously recorded facial image, prior to unlocking gate

515. It is noted that this authentication process allows for a single security guard to be able to control access by workers through multiple gates to a single work site, or through separate gates at multiple work sites.

Audio speaker 555 and microphone 565 may also be used to implement the performance of an additional step to provide access through gate 515. Thus, for example, upon comparison of stored and recorded biometric data, gate control system 525 through speaker 555 may next prompt a presenting worker to close his or her eyes. The biometric system can then record biometric data again and compare the previously recorded biometric data (eyes open) with the newly recorded biometric data (eyes closed), and ensure the biometric data is identical, but for the closure of eyes. This additional step can protect against a worker illicitly presenting a facial image or photograph to the system, and attempt the system to use the image to obtain the recorded biometric data.

Referring again to FIG. 4, electronic access control system 410 further includes a recording device 170, for example an NVR or a DVR, to record sound and/or video for each entry or attempted entry by a worker into work space 155. Video recordings can be used as desired, for example, to confirm entries by workers, or to evaluate possible elicit entry attempts by more than one worker, upon a first worker having opened gate 515.

Similarly, in at least one implementation, gate sensor 570 is used to confirm the worker has entered through gate 515, and that no other individuals have followed the first worker. In some implementations, gate sensor 570 can be a camera for detecting the number of individuals passing through gate 515.

It is noted that in some implementations, camera lens 550 is placed adjacent to gate 515 to allow recording of the biometric data when a worker is positioned in area 520*b* in front of gate 515, and to also allow video recordal of workers through entry through gate 515.

Referring next to FIG. 10, in some implementations, a system 1000 may be configured to allow for the identification in work space 155 of personal protective equipment and non-personal personal protective equipment objects present in work space 155 using a first and/or second plurality of images captured by image sensors 120 and/or 125. In this respect, personal protective equipment, exemplified by safety vests 107*a* and 107*b* and safety helmets 110*a* and 110*b* are separately tagged with barcodes 109*a*, 109*b*, 115*a* and 115*b*. In addition, non-personal protective equipment exemplified by wheelbarrows 133 and 1033 are separately tagged with barcodes 1010 and 1020, respectively. The barcodes comprise object information identifying the objects, i.e. barcodes 1010 and 1020 include object information allowing objects 133 and 1033 to be identified as wheel barrows. System 1000 is configured so that central processing unit 1046 is coupled to input/output device 1030 in a manner that permits a user to input barcodes (e.g. barcode 109*a*, 109*b*, 115*a*, 115*b*, 1010 and 1020) as a query term, via a user entry that provides input data. Thus, a user may provide input data for example, by scanning a copy of barcode 109*a*, 109*b*, 115*a*, 115*b*, 1010 or 1020, using a barcode scanner (not shown), or by selecting barcode 109*a*, 109*b*, 115*a*, 115*b*, 1010 or 1020 in a database in which the same barcodes have been entered. The database may be housed by central controller 145 or be provided by a separate data store that is accessible by the central controller 145. Image sensors 120 and/or 125 together with central processing unit 146 are further configured to detect barcode objects in the first and/or second plurality of images and to read the corresponding barcodes as described in previous embodiments. Thus, in each image captured by image sensors 120 and/or 125 multiple barcode objects may detected and the barcodes corresponding with the barcode objects may be read. For example, in an image from a first or second plurality of images captured by image sensor 120 of work space 155, barcodes 109*a*, 109*b*, 115*a*, 115*b*, 1010 and 1020 may be read. The read barcodes may be stored in a relational database, where the database is implemented so that each read barcode is linked to the specific image from which it was read, using, for example, the unique meta-data of the image that is obtained by the accessing ancillary processing unit 180. Thus, a specific image of work space 155 (referred to herein, by way of example, as "Image 1") captured by image sensor 120 may also be stored in a relational database, for example, a relational database contained by central controller 145, together with the time the Image 1 was taken (as present in the meta-data), e.g. 11:01 AM May 7, 2021, and barcodes 109*a*, 109*b*, 115*a*, 115*b*, 1010 and 1020.

In some implementations, the read barcode may be incorporated as part of the metadata together with the image in which the barcode was read. As such, it is to be understood that the metadata in which read barcodes have been included together with stored images, can be stored so as to form a relational database wherein read barcodes are linked to the specific image from which they were read, and other metadata, such as, for example, the time the image was captured. As hereinbefore noted, in some implementations, the images may be stored using recording device 170 in lower resolution format. It is noted that, in this respect, it is preferable to configure central processing unit 146 to detect and read the barcodes prior to proceeding with a reduction of resolution level and image storage since it may be more difficult to perform barcode reading on lower resolution images.

Central processing unit 146 is further configured to, upon receipt of an input query barcode, compare the read barcodes in the relational database with the input query barcode, and provide an output to input/output device 1030 when a match is identified between one of the read barcodes and the query barcode. The input/output device 1030 may be implemented as described from input and output devices 140 and 150. Thus, for example, when a user has entered barcode 1010 as a query barcode into input/output device 1030, input/output device 1030 provides output when a match is identified between one of the stored read barcodes in the relational database and the query barcode, and the output may be the image of work space 155 linked to the matching barcode in the relational database captured by image sensor 120 or 125, where the image includes a barcode object that corresponds to the query barcode.

In some implementations, central processing unit 146 is configured to identify one image that corresponds to (i.e. has a barcode object) that is related to a match between a stored barcode and a query barcode. For example, the match may correspond with a given image that was most recently captured by image sensor 120 or 125, relative to the input time of the query barcode, where the given image includes a barcode object that corresponds to the query barcode. In other implementations, central processing unit 146 is configured to identify up to 5 image matches, up to 10 image matches, or up to 50 image matches further backwards in time, or all image matches within a certain period of time, for example, from the image most recently captured relative to the time of the input query barcode through to all images captured in the preceding hour, day, or week.

The output provided by input/output device 1030 preferably comprises a time indicator corresponding with the time that each matched image was captured by image sensor 120 and/or 125 and may further comprise the matched image(s) comprising the corresponding barcode object.

Thus, by way of example, system 1000 may be configured so that the output provided by input/output device 1030 comprises: (a) a time indicator corresponding with the time that given image was captured by image sensor 120 and includes a barcode object that matches the query barcode and (b) the given image comprising the corresponding barcode object when a match is identified. The system 1000 may further be configured so that one match is identified, namely a match corresponding with an image (that includes a read barcode object corresponding to the query barcode) was most recently captured by image sensor 120, relative to the input time of the query barcode. For example, when a user at 11:49 AM on May 7, 2021 enters barcode 1010 as a query barcode into input/output device 1030, the output may be a time stamp "11:40 AM May 7, 2021" and a copy of Image 1 (the last image prior to the time the query barcode was entered where the image has a barcode object that matches the barcode query), and the output may be depicted on the screen of input/output device 1030. Thus, the user is informed by system 1000 that wheelbarrow 1033 was located in work space 155 at least as recently as at 11:40 AM May 7, 2021, and the user can inspect Image 1 to confirm the presence of wheelbarrow 1030. Similarly, when a user at 11:49 AM on May 7, 2021 enters barcode 109*a* as a query barcode into input/output device 1030, the output may be a time stamp "11:40 AM May 7, 2021" and a copy of Image 1 (the last image prior to the time the query barcode was entered where the image has a barcode object that matches the barcode query), and the output may be depicted on the screen of input/output device 1030. Thus, the user is informed by system 1000 that safety vest 109*a*, and most likely extension worker 105*a*, were located in work space 155 at least as recently as at 11:40 AM May 7, 2021, and the user can inspect Image 1 to confirm the presence of safety vest 109*a* and worker 105*a*.

Thus, by way of another example, system 1000 may be configured so that the output provided by input/output device 1030 comprises a time indicator corresponding with the times that N number of images were captured by image sensor 120 where N is an integer, the N images each include a barcode object that matches the query barcode and the system may further be configured to set N to a predetermined number such as 5, for example, so that the 5 latest temporally obtained images that are matches are identified, so in this example the output includes an image match for the most recently captured image by image sensor 120, relative to the input time of the query barcode, that includes a barcode object that matches the query barcode and the 4 successively earlier image matches. For example, when a user at 11:49 AM on May 7, 2021 enters barcode 1010 as a query term into input/output device 1030, the output may be the following time indicators "11:40 AM May 7, 2021"; "11:30 AM, May 7, 2021"; "11:20 AM May 7, 2021", "11:10 AM May 7, 2021"; and "11:00 AM May 7, 2021". Thus, a user is informed by system 1000 that wheelbarrow 133 was located in work space 155 at least at 11:00 AM May 7, 2021, and 11:40 AM May 7, 2021, and the noted times in between.

It will now therefore be clear that in this manner, system 1000 permits a user, in general, to determine whether and when personal protective equipment items such as, for example, safety vests 107*a*, 107*b*, and safety helmets 110*a* and 110*b* and/or non-personal protective equipment, wheelbarrows 133 and 1033 were present in a work space, such as work space 155.

In further implementations, input/output device 1030 can be configured to receive, in addition to query barcodes, one or more query time periods during which the user wishes to identify images with image objects such as barcode objects that match the query barcodes, for example. Thus, a query time period may be defined by first and second times; for example, a user may provide input "from 11:00 AM on May 7, 2021 until 1:15 PM on May 7, 2021" to input/output device 1030, or a user may provide input such as "from 1:00 PM today onwards" to input/output device 1030. Central processing unit 146 is configured to parse the user entry to determine the first and second times for the query time period. Central processing unit 146 is further configured to, upon receipt of a query barcode, use the query time period to identify a set of images that was obtained during the query time period and then analyze the set of images to determine which have barcode objects that match the input query barcode with the read barcodes stored in the relational database, for example, preferably, by analyzing meta-data including an identification of the images associated with the read barcode, and to provide output in the form of time indicators for the times of the matched images and/or the matched images corresponding with images captured by sensors 120 and/or 125 within the query input time period.

Thus, by way of another example, system 1000 may be configured so that the input/output device 1030 may receive a query time period in which the user wishes to identify any images that were acquired during the query time period and includes a barcode object, which may be received by way of a query barcode provided by the user, and the output provided by input/output device 1030 may be a time indicator that indicates one or more times for one or more matched images that were captured by image sensor 120 during the query time period. For example, when a user enters barcode 1010 as a query term and "from 11:20 AM, May 7, 2021 to 11:55 AM, May 2021" as query time period into input/output device 1030, the central processing unit 146 is configured to try to identify a matched image, as described previously and upon finding the matched image generate an output which may include one of the following time indicators "11:20 AM May 7, 2021"; "11:30 AM, May 7, 2021"; "11:40 AM May 7, 2021", and "11:50 AM May 7, 2021". Thus, a user is informed by system 1000 that wheelbarrow 133 was located in work space 155 at 11:20 AM May 7, 2021"; "11:30 AM, May 7, 2021"; "11:40 AM May 7, 2021", and "11:50 AM May 7, 2021, and a user may reasonably conclude that it is likely that wheelbarrow 133 was located in work space 155 during the entire query time period.

In another aspect, in at least one implementation in accordance with the teachings herein, the present disclosure also provides a process as shown in FIG. 2. Thus, referring to FIG. 2 now, the present disclosure includes a process 200 for monitoring the use of personal protective equipment in a work space. The process 200 comprises a first step 205 where a worker is equipped with personal protective equipment comprising a barcode identifying the corresponding personal protective equipment and user information for the worker. The user information may be the worker's name, birthdate, telephone number, and/or some other identification that is unique to the worker. The remainder of the process 200 involves the image capture and image analysis of the worker equipped with the PPE, and if warranted the automatic execution of a safety action.

Second step 210 of process 200 may be initiated in a variety of ways such as, for example, by a worker who uses the personal protective equipment, who initiates the authentication process, for example, by using a handheld device that is communicatively coupled to a central controller. In another implementation, second step 210 may be initiated by the worker interacting with a scanner, for example a barcode scanner, or simply by the worker entering a work space in which first and second image sensors have been installed.

Process 200 further comprises a third step 215 comprising capturing a first plurality of images using first and second image sensors installed in the work space.

Process 200 further comprises a fourth step 220 comprising detecting human form objects by applying to each of the captured images a first image analysis algorithm, such as a human form object image analysis algorithm or a computational neural network. The human form object image analysis algorithm includes software instructions that configures a processing unit to classify and detect human form objects in the first plurality of images, as hereinbefore described.

Process 200 further comprises fifth, and sixth steps 225 and 230 comprising determining if at least one human form object has been detected in one of the first plurality of images (step 225) and selecting a second plurality of images from the first plurality of images where the second plurality of images comprise the one or more detected human form objects (step 230). In certain instances, no human form objects may be detected in the first plurality of images in step 225. For example, this may be the case when no workers are present in the fields of view 157 or 158 of image sensor 120 or 125, respectively, (step 227). In such circumstances, process 200 can then return to step 215, and capture new images.

However, when the second plurality of images containing one or more detected human form objects are obtained then process 200 proceeds to a seventh step 235 comprising defining image regions which each comprise one of the detected human form objects in each of the second plurality of images. Techniques for defining the image regions were explained previously.

Process 200 then proceeds to an eighth step 240 comprising detecting a barcode object in a defined image region by applying to the image regions a second image analysis algorithm, such as a barcode object image analysis algorithm or a computational neural network that is configured to classify barcode objects, to the second plurality of images, as hereinbefore described. Alternatively, the use of defined image regions may be optional in other embodiments in which case larger regions of the whole image of the second plurality of images are analyzed to detect at least one barcode object.

Process 200 further comprises a ninth step 245 comprising selecting a first detected barcode object from the detected barcode objects of the second plurality of images.

Process 200 further comprises a tenth step 250 comprising performing searching using a first barcode, which is namely the barcode corresponding with the first detected barcode object selected in step 245. This searching can be done in a database or data store to locate user information that is linked to the first barcode identifying a worker who corresponds with the detected human form object in the defined image regions of the second plurality of images.

Process 200 further comprises an eleventh step 255 comprising searching for additional barcodes and corresponding additional barcode objects that might be linked to the located user information for the identified worker. These additional barcode objects may be associated with personal protective equipment items that the identified worker should wear when he or she is in the work space.

Process 200 further comprises a twelfth step 260 comprising applying a probabilistic algorithm to determine the prevalence of the detected barcodes objects in the defined image regions of the second plurality of images where the detected barcode objects include the first detected barcode and the additional barcodes linked to the user information located for the first detected barcode, and based on the prevalence computing the probability that the user corresponding with the detected human form object is wearing each personal protective equipment that they should be in accordance with safety rules applicable to the work space, as previously described. Accordingly, there is a probability value that is computed for each barcode object.

Process 200 further comprises a thirteenth step 265 comprising determining if the computed probabilities falls below a predetermined probability threshold value. If a given barcode object has a computed probability that is lower than the predetermined probability threshold then this means that it is likely that the worker is not wearing the PPE item that is associated with the given barcode objects.

Process 200 further comprises a fourteenth step 270 comprising executing a safety action for each barcode object with a computed probability that is lower than the predetermined probability threshold value. The safety action is based on safety rules data that are saved in the database or the datastore. Examples of safety actions were provided earlier.

It should be noted that steps 230 to 270 are repeated for each detected human form object in the first plurality of images that correspond to a unique worker. Accordingly, for each worker that is in the first plurality of images, the probability calculations are performed for each barcode object associated with each worker.

Upon completion of process 200, either by the execution of at least one safety action (step 270) or by no execution of such action, the process 200 may be reiterated starting at step 215 so that the process 200 is repeated for a different first plurality of images that are obtained at a subsequent point in time.

As herein before discussed, the automated system of the present disclosure in in one implementation can also be configured to allow for the identification of personal protective equipment and non-personal personal protective equipment present in the work space, using the first and second plurality of images. Accordingly, in another aspect, the present disclosure further provides processes as shown in FIGS. 11A and 11B.

Thus, referring to FIG. 11A now, the present disclosure includes a process 1100 for the identification in a work space of personal protective equipment and non-personal personal protective equipment present in the work space. Process 1100 comprises a first step 1105 where a user provides an input query barcode. The remainder of process 1100 involves the identification of a matching barcode in the first and/or second plurality of images captured by, for example, process 200, and providing output in the form of a time indicator for the time that an image was captured where the image includes a matching barcode object and/or the output may be the matching image.

Process 1100 further comprises second step 1110 comprising matching the query barcode with one of the read stored barcodes. As hereinbefore noted, barcodes objects in images captured by an image sensor may be identified and then the barcodes can be read for the identified barcode objects. Read barcodes may then be stored in a relational database linking the read barcodes to the specific images captured by image sensors and containing the barcode objects from which the barcodes were read. The query barcode, received in step 1105 from user input, may then be matched with stored read barcodes. In the event a match is found process 1100 proceeds with step 1120. In the event no match is found process 1100 reverts to step 1105.

Process 1100 further comprises third step 1115 comprising receiving the time of the image and/or the actual image itself corresponding (i.e. that is linked) with the stored barcode that matches the query barcode. The time and/or image for the matching stored barcode may, for example, be the image that was most recently captured relative to the time the input query barcode was received in step 1105.

Process 1100 further comprises fourth step 1120 comprising providing output in the form of a time indicator corresponding with the time the image, comprising the barcode that matches with the query barcode, was captured and/or the image itself. Process 1100 may then revert to step 1105 allowing a user to provide further input in the form of a query barcode.

Referring next to FIG. 11B now, the present disclosure includes a further process 1101 for the identification of personal protective equipment and non-personal personal protective equipment present in a work space. Process 1101 comprises a first step 1125 where an input query barcode and a query time period defined by first and second times are received via user input. The remainder of process 1101 involves the identification of a matching barcode in the first and/or second plurality of images captured by, for example, process 200, within the query time period and providing output in the form of a time indicator including one or more times and/or one or more images that include the query barcode.

Process 1101 further comprises second step 1130 comprising matching the query barcode with read stored barcodes within the query time period. As hereinbefore noted, barcode objects in images captured by an image sensor may be identified and then read the barcodes can be read from the identified barcode objects. The read barcodes may be stored in a relational database linking the read barcodes to the specific images that contained the barcode objects corresponding to the read barcodes. The query barcode, received in step 1125, may be matched with stored barcodes. In the event a match is found process 1101 proceeds with step 1135. In the event no match is found, process 1101 reverts to step 1125 at which point a user may be allowed to provide further input in the form of another query barcode.

Process 1101 further comprises third step 1140 comprising receiving the time of the image and/or the actual image itself corresponding (i.e. that is linked) with the stored barcode that matches the query barcode. The time and/or image for the matching stored barcode may, for example, be the image that was most recently captured relative to the time the input query barcode was received in step 1125.

Process 1101 further comprises fourth step 1140 comprising providing output in the form of a time indicator corresponding with the time the image, comprising the barcode that matches with the query barcode, was captured and/or the image itself, and the query time period. Process 1101 may then revert to step 1125 allowing a user to provide further input in the form of a query barcode.

Thus the foregoing automated processes allow for monitoring the use of personal protective equipment and non-personal protective equipment in a work space.

While the applicant's teachings described herein are in conjunction with various implementations for illustrative purposes, it is not intended that the applicant's teachings be limited to such implementations. On the contrary, the applicant's teachings described and illustrated herein encompass various alternatives, modifications, and equivalents, without departing from the implementations described herein, the general scope of which is defined in the appended claims.

The invention claimed is:

1. A system for automatic monitoring of the-a use of personal protective equipment by workers in a work space, the system comprising:

a plurality of barcodes, each barcode being associated with a unique personal protective equipment item and comprising object information identifying the associated personal protective equipment item and user information for a given worker who uses the personal protective equipment item;

first and second image sensors installable in the work space, where the first and second image sensors are spaced apart from one another and located to cover different first and second field of views, respectively, the first and second field of views overlapping in a given area in the work space, and the first and second image sensors being adapted to collectively capture a first plurality of images of the given area, wherein the first plurality of images comprises a first set of temporally sequential images captured by the first image sensor during a given period of time and a second set of temporally sequential images captured at approximately a same time by the second image sensor during the given period of time; and a central controller that is coupled to the first and second image sensors, the central controller comprising at least one processor and a memory element comprising a database configured to store the plurality of barcodes and the user information so that one or more barcodes are linked with the user information of the given worker;

the at least one processor and the first and second image sensors together being configured to:

(i) detect a human form object in the first plurality of images;

(ii) identify a second plurality of images from the first plurality of images where the second plurality of images include the detected human form object, and the second plurality of images includes at least some of the first and second set of temporarily sequential images;

(iii) detect a first barcode object in at least one of the second plurality of images where the first barcode object is associated with the detected human form object;

(iv) identify a first barcode corresponding with the detected first barcode object;

(v) perform a search in the database using the first barcode to identify the user information linked therewith which is then used to identify additional barcodes in the database that are linked with the identified user information;

(vi) detect additional barcode objects in the second plurality of images, that correspond with the identified additional barcodes;

(vii) apply a probabilistic algorithm to compute the-probabilities that the worker corresponding with the detected human form object is wearing each personal protective equipment item associated with the first detected barcode and the identified additional barcodes in accordance with thesafety rules applicable to the work space, the probabilistic algorithm being applied to determine a prevalence of each barcode object corresponding to the first detected barcode and the identified additional barcodes from the database being detected in each image from the second plurality of images; and (viii) execute a safety action for each of the first detected barcode and additional barcode objects with computed probabilities that are lower than a predetermined probability threshold value, wherein the central controller is coupled to an input device, the input device is configured to receive user entry in the form of a query barcode, and the central controller and the first and second image sensors are further configured to detect a plurality of barcode objects and read barcodes corresponding therewith in each of the first and second plurality of images and to store the read barcodes in a second database configured to store a plurality of read barcodes and images together with the-a time at which the images were captured by the first and/or second image sensor by using a linked relationship so that one or more read barcodes are linked with an image from which the one or more read barcodes were detected and the time the image was captured by the first and/or second image sensor, and the central controller is further configured to determine if there is a match between the query barcode and one of the stored read barcodes, wherein the query barcode is associated with a non-personal protective equipment item.

2. A system according to claim 1, wherein the central controller is coupled to an output device, and wherein the central controller is configured to provide output to the output device when the query barcode is matched to one of the stored read barcodes.

3. A system according to claim 2, wherein the output includes a time indicator indicating a time when the image that is linked to the barcode that is matched to the query barcode was captured by the first and/or second image sensor, wherein the time indicator corresponds with a most recent time at which a match between the query barcode and one of the read-stored read barcodes was made relative to a time that the query barcode was received from the user.

4. A system according to claim 2, wherein the output includes an image that is linked to the barcode that is matched to the query barcode, wherein the image corresponds with a most recent time at which a match between the query barcode and one of the stored read barcodes was made relative to a time that the query barcode was received from the user.

5. A system according to claim 2, wherein the output includes N time indicators, wherein N is an integer, each time indicator indicating a time when the image that is linked to the barcode that is matched to the query barcode was captured by the first and/or second image sensor, and wherein the N time indicators correspond with the N most recent times at which a match between the query barcode and one of the stored read barcodes was made relative to a time that the query barcode was received from the user.

6. A system according to claim 2, wherein the output includes N images, wherein N is an integer, where each of the N images is linked to the barcode that is matched to the query barcode, and wherein the N images correspond with the N most recent times at which a match between the query barcode and one of the stored read barcodes was made relative to a time that the query barcode was received from the user.

7. A system according to claim 2, wherein the input device is configured to receive user input in the form of a time period for which the first and second plurality of images were captured.

8. A system according to claim 7, wherein the output includes a time indicator corresponding with the time at which the image that is linked to the barcode that is matched to the query barcode was captured by the first and/or second image sensor.

9. A system according to claim 7, wherein the output includes an image corresponding with the time at which the image that is linked to the barcode that is matched to the query barcode was captured by the first and/or second image sensor.

10. A system according to claim 1, wherein first and second image sensors are spaced apart and angled so that an intersection between a first axis and a second axis that centrally extend through the fields of view of the first image sensor and the second image sensor, respectively, form an angle that ranges between about 15 degrees and about 175 degrees, or between about 205 degrees and about 345 degrees.

11. A system process according to claim 10, wherein the angle ranges between about 30 degrees and about 150 degrees, or between about 210 degrees and about 330 degrees.

12. An automated process for monitoring a use of personal protective equipment by workers in a work space, the process comprising:

obtaining a first plurality of images using first and second image sensors installable in the work space, where the first and second image sensors are spaced apart from one another and located to cover different first and second field of views, respectively, and the first and second field of views overlap in a given area in the work space, the first plurality of images including a first set of temporally sequential images captured by the first image sensor during a given period of time and a second set of temporally sequential images being captured at approximately a same time by the second image sensor during the given period of time;

detecting a human form object of a given worker in the first plurality of images;

identifying a second plurality of images from the first plurality of images where the second plurality of images include the detected human form object, and the second plurality of images includes at least some of the first and second set of temporarily sequential images;

detecting a first barcode object in at least one of the second plurality of images where the first barcode object is associated with the detected human form object;

identifying a first barcode corresponding with the detected first barcode object;

performing a search in a database using the first barcode to identify the user information linked therewith which is then used to identify additional barcodes in the database that are linked with the identified user information where the database stores a plurality of barcodes and user information using a linked relationship so that one or more barcodes are linked with the user information of the workers;

detecting additional barcode objects in the second plurality of images, that correspond with the identified additional barcodes;

applying a probabilistic algorithm to compute probabilities that the given worker corresponding with the detected human form object is wearing each personal protective equipment item associated with the first detected barcode and the identified additional barcodes in accordance with safety rules applicable to the work space, the probabilistic algorithm being applied to determine a prevalence of each barcode object corresponding to the first detected barcode and the identified additional barcodes from the database being detected in each image from the second plurality of images; and executing a safety action for each of the first detected barcode and additional barcode objects with computed probabilities that are lower than a predetermined probability threshold value, wherein the central controller is coupled to an input device, the input device is configured to receive user entry in the form of a query barcode, and the central controller and the first and second image sensors are further configured to detect a plurality of barcode objects and read barcodes corresponding therewith in each of the first and second plurality of images and to store the read barcodes in a second database configured to store a plurality of read barcodes and images together with the-a time at which the images were captured by the first and/or second image sensor by using a linked relationship so that one or more read barcodes are linked with an image from which the one or more read barcodes were detected and the time the image was captured by the first and/or second image sensor, and the central controller is further configured to determine if there is a match between the query barcode and one of the stored read barcodes, wherein the query barcode is associated with a non-personal protective equipment item.

13. An automated process according to claim 12, wherein the central controller is coupled to an output device, and wherein the central controller is configured to provide output to the output device when the query barcode is matched to one of the stored read barcodes.

14. An automated process according to claim 13, wherein the output includes a time indicator indicating a time when the image that is linked to the barcode that is matched to the query barcode was captured by the first and/or second image sensor, wherein the time indicator corresponds with a most recent time at which a match between the query barcode and one of the stored read stored barcodes was made relative to a time that the query barcode was received from the user.

15. An automated process according to claim 13, wherein the output includes an image that is linked to the barcode that is matched to the query barcode, wherein the image corresponds with a most recent time at which a match between the query barcode and one of the stored read barcodes was made, relative to a time that the query barcode was received from the user.

16. An automated process according to claim 13, wherein the output includes N time indicators, wherein N is an integer, each time indicator indicating a time when the image that is linked to the barcode that is matched to the query barcode was captured by the first and/or second image sensor, wherein the N time indicators correspond with the N most recent times at which a match between the query barcode and one of the stored read barcodes was made relative to a time that the query barcode was received from the user.

17. An automated process according to claim 13, wherein the output includes N images, wherein in N is an integer, where each of the N images is linked to the barcode that is matched to the query barcode, and wherein the N images correspond with the N most recent times at which a match between the query barcode and one of the stored read barcodes was made, relative to a time that the query barcode was received from the user.

18. An automated process according to claim 13, wherein the input device is configured to receive user input in the form of a time period for which the first and second plurality of images were captured.

19. An automated process according to claim 18, wherein the output includes a time indicator corresponding with the time at which the image that is linked to the barcode that is matched to the query barcode was captured by the first and/or second image sensor.

20. An automated process according to claim 18, wherein the output includes an image corresponding with the time at which the image that is linked to the barcode that is matched to the query barcode was captured by the first and/or second image sensor.

* * * * *